United States Patent
Camagna et al.

(10) Patent No.: US 9,191,216 B2
(45) Date of Patent: *Nov. 17, 2015

(54) SOLID STATE TRANSFORMER-LESS METHOD TO FEED HIGH BANDWIDTH DATA AND POWER SIGNALS FROM A NETWORK ATTACHED POWER SOURCING DEVICE

(75) Inventors: John R. Camagna, El Dorado Hills, CA (US); Sajol Ghoshal, Austin, TX (US); J. Francois Crepin, Orangevale, CA (US)

(73) Assignee: AKROS SILICON, INC, San Jose, CA (US)

( * ) Notice: Subject to any disclaimer, the term of this patent is extended or adjusted under 35 U.S.C. 154(b) by 1126 days.

This patent is subject to a terminal disclaimer.

(21) Appl. No.: 11/249,246

(22) Filed: Oct. 13, 2005

(65) Prior Publication Data
US 2006/0215339 A1    Sep. 28, 2006

Related U.S. Application Data

(60) Provisional application No. 60/665,766, filed on Mar. 28, 2005.

(51) Int. Cl.
*H04L 12/28* (2006.01)
*H04L 12/10* (2006.01)

(52) U.S. Cl.
CPC .................................. *H04L 12/10* (2013.01)

(58) Field of Classification Search
None
See application file for complete search history.

(56) References Cited

U.S. PATENT DOCUMENTS

| | | | |
|---|---|---|---|
| 7,408,923 B1 * | 8/2008 | Khan et al. | 370/352 |
| 7,447,191 B2 * | 11/2008 | Mouton et al. | 370/352 |
| 2006/0215343 A1 * | 9/2006 | Camagna et al. | 361/111 |
| 2006/0218418 A1 * | 9/2006 | Camagna et al. | 713/300 |
| 2006/0218422 A1 * | 9/2006 | Camagna et al. | 713/300 |
| 2007/0208961 A1 * | 9/2007 | Ghoshal et al. | 713/300 |
| 2007/0260904 A1 * | 11/2007 | Camagna et al. | 713/310 |

* cited by examiner

*Primary Examiner* — Duc C Ho

(57) ABSTRACT

Embodiments of the present invention provide a power source equipment (PSE) network device operable to provide a network signal that may include both power and data. This PSE network device includes a network connector and an integrated circuit. The network connector physically couples the PSE network device to the network. The integrated circuit further includes a power feed circuit. This power feed circuit is operable to combine and pass the received data signals and power signal as a single network signal. A PSE controller electrically couples to the integrated circuit but is not necessarily part of the integrated circuit. The PSE controller is operable to govern the production and distribution of the power portion of the network signal.

30 Claims, 21 Drawing Sheets

SOLID STATE TRANSFORMER-LESS METHOD TO FEED HIGH BANDWIDTH DATA AND POWER SIGNALS FROM A NETWORK ATTACHED POWER SOURCING DEVICE

CROSS REFERENCE TO RELATED APPLICATIONS

This application claims the benefit of priority to and incorporates herein by reference in its entirety for all purposes, U.S. Provisional Patent Application No. 60/665,766 entitled "SYSTEMS AND METHODS OPERABLE TO ALLOW LOOP POWERING OF NETWORKED DEVICES," by John R. Camagna, et al. filed on Mar. 28, 2005. This application is related to and incorporates herein by reference in its entirety for all purposes, U.S. patent application Ser. No. 11/207,595 entitled "METHOD FOR HIGH VOLTAGE POWER FEED ON DIFFERENTIAL CABLE PAIRS," by John R. Camagna, et al.; and U.S. Pat. No. 7,469,348 entitled "A METHOD FOR DYNAMIC INSERTION LOSS CONTROL FOR 10/100/1000 MHZ ETHERNET SIGNALLING," by John R. Camagna, et al., which have been filed concurrently.

TECHNICAL FIELD OF THE INVENTION

The present invention relates generally to power distribution, and more particularly, a solid state transformer-less method for coupling high bandwidth data signals and power signals between a network and a network attached device.

BACKGROUND OF THE INVENTION

Many networks such as local and wide area networks (LAN/WAN) structures are used to carry and distribute data communication signals between devices. The various network elements include hubs, switches, routers, and bridges, peripheral devices, such as, but not limited to, printers, data servers, desktop personal computers (PCs), portable PCs and personal data assistants (PDAs) equipped with network interface cards. All these devices that connect to the network structure require power in order to operate. The power of these devices may be supplied by either an internal or an external power supply such as batteries or an AC power via a connection to an electrical outlet.

Some network solutions offer to distribute power over the network in addition to data communications. The distribution of power over a network consolidates power and data communications over a single network connection to reduce the costs of installation, ensures power to key network elements in the event of a traditional power failure, and reduces the number of required power cables, AC to DC adapters, and/or AC power supplies which create fire and physical hazards. Additionally, power distributed over a network such as an Ethernet network may provide an uninterruptible power supply (UPS) to key components or devices that normally would require a dedicated UPS.

Additionally, the growth of network appliances, such as but not limited to, voice over IP (VOIP) telephones require power. When compared to their traditional counterparts, these network appliances require an additional power feed. One drawback of VOIP telephony is that in the event of a power failure, the ability to contact to emergency services via an independently powered telephone is removed. The ability to distribute power to network appliances or key circuits would allow network appliances, such as the VOIP telephone, to operate in a similar fashion to the ordinary analog telephone network currently in use.

The distribution of power over Ethernet network connections is in part governed by the IEEE Standard 802.3 and other relevant standards. These standards are incorporated by reference. However, these power distribution schemes within a network environment typically require cumbersome, real estate intensive, magnetic transformers. Additionally, power over Ethernet (PoE) requirements under 802.3 are quite stringent and often limit the allowable power.

There are many limitations associated with using these magnetic transformers. Transformer core saturation can limit the current that can be sent to a power device. This may further limit the performance of the communication channel. The cost and board space associated with the transformer comprise approximately 10 percent of printed circuit board (PCB) space within a modern switch. Additionally, failures associated with transformers often account for a significant number of field returns. The magnetic fields associated with the transformers can result in lower electromagnetic interference (EMI) performance.

However, magnetic transformers also perform several important functions such as providing DC isolation and signal transfer in network systems. Thus, there is a need for an improved approach to distributing power in a network environment that addresses limitations imposed by magnetic transformers while maintaining the benefits thereof.

SUMMARY OF THE INVENTION

Embodiments of the present invention provide a system and method operable to provide a voltage power feed on differential cable pairs to network attached powered devices (PD). This voltage power feed from power source equipment (PSE) to PDs substantially addresses the above-identified needs, as well as others. More specifically, various embodiments of the present invention provide a PSE network device operable to provide a network signal that may include both power and data. This PSE network device includes a network connector and an integrated circuit. The network connector physically couples the PSE network device to the network. The integrated circuit further includes a power feed circuit. This power feed circuit is operable to combine and pass the received data signals and power signal as a single network signal. A PSE controller electrically couples to the integrated circuit but is not necessarily part of the integrated circuit. The PSE controller is operable to govern the production and distribution of the power portion of the network signal.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION

Figure 1A:
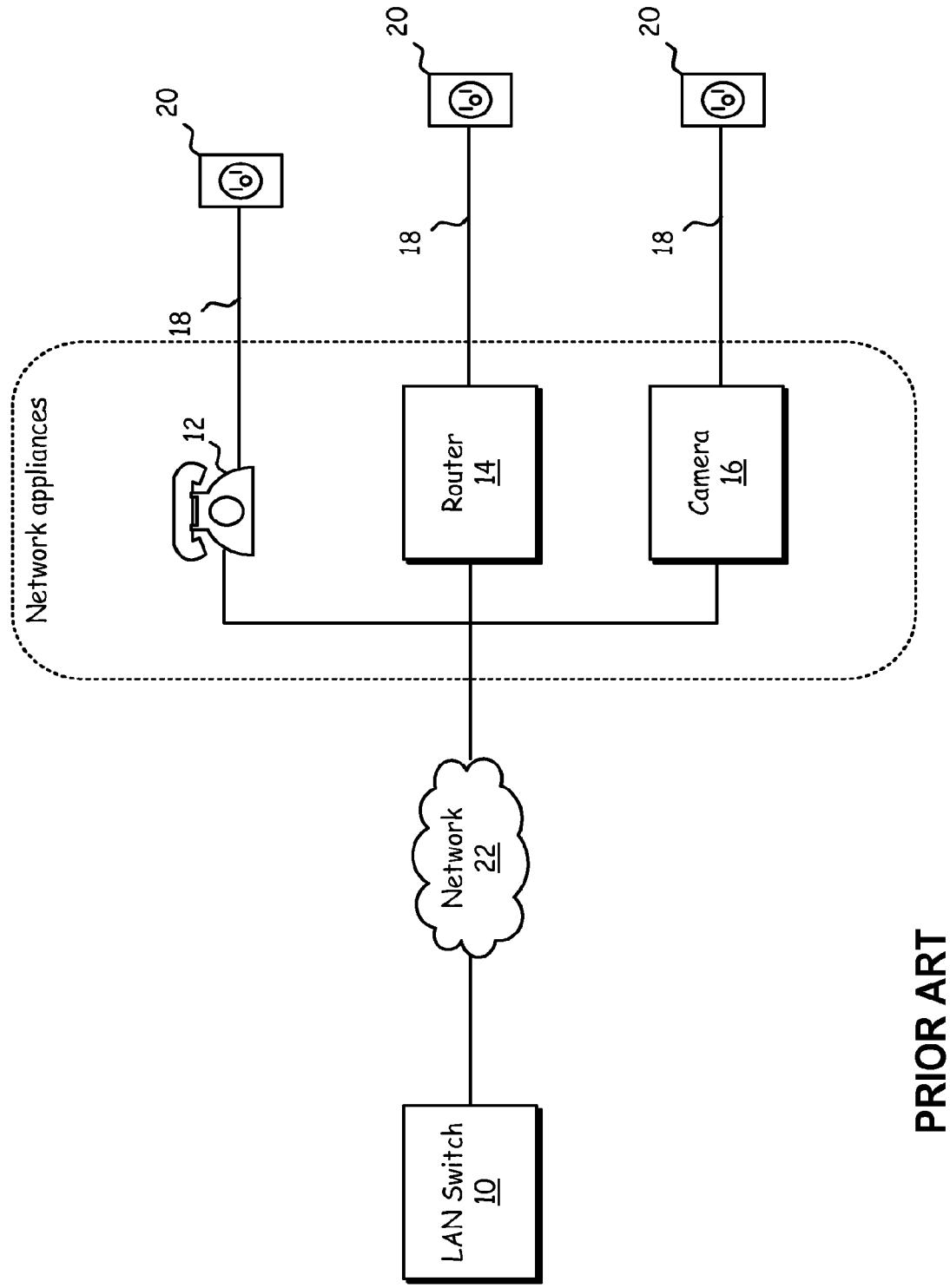
FIG. 1A depicts current Ethernet network appliances attached to the network and powered separately and their separate power connections.

Preferred embodiments of the present invention are illustrated in the FIGs., like numerals being used to refer to like and corresponding parts of the various drawings.

The 802.3 Ethernet Standards, which is incorporated herein by reference, allow loop powering of remote Ethernet devices (802.3af). The Power over Ethernet (PoE) standard and other like standards intends to standardize the delivery of power over Ethernet network cables in order to have remote client devices powered through the network connection. The side of link that supplies the power is referred to as Powered Supply Equipment (PSE). The side of link that receives the power is referred to as the Powered device (PD).

Replacing the magnetic transformer of prior systems while maintaining the functionality of the transformer has been subsumed into the embodiments of the present invention. In order to subsume the functionality of the transformer, the circuits provided by embodiments of the present invention, which may take the form of ICs or discrete components, are operable to handle these functions. These functions may include, in the case of an Ethernet network application:

1) coupling of a maximum of 57V to the IC with the possibility of 1V peak-peak swing of a 10/100/1000 M Ethernet signaling, (2.8Vp_p for MAU device);
2) splitting or combining the signal; 57V DC to the 802.3af Power Control unit and AC data signal to the PHY (TX and RX), while meeting the high voltage stress.
3) coupling lower voltage (5 v and 3.3 v) PHY transceiver to high voltage cable (57V)
4) supplying power of 3.3V or 12V through DC-DC peak converter;
5) withstanding system-level lighting strikes: indoor lighting strike (ITU K.41); outdoor lighting strike (IEC 60590)
6) withstanding power cross @60 Hz. (IEC 60590)
7) fully supporting IEEE 802.3af Specification Other network protocols may allow different voltage (i.e., a 110 volt circuit coupling to the IC) data rates (i.e., 1 GBPS or higher), power rating.

In a solid-state implementation, common mode isolation between the earth ground of the device and the cable is not necessarily required. Fixed common mode offsets of up to 1500V are possible in traditional telephony systems. Embodiments of the present invention deliver power via cable and the earth ground is used solely for grounding of the device chassis. As there is no DC electrical connection between the earth and PoE ground, large voltage offsets are allowable. The PSE side has a data connection which may be optically or capacitively isolated. The PSE power supply is isolated as well. This isolation will be described with reference to FIGS. 6B through 6D.

Second, another transformer function provides surge and voltage spike protection from lightning strike and power cross faults. Wires inside the building comply with the ITU recommendation K.41 for lightning strikes. Lines external to the building must comply with IEC60950. Lightning strike testing as specified in these Standards consists in a common mode voltage surge applied between all conductors and the earth or chassis ground. As embodiments of the present invention have no DC connection to earth ground, minimal stress will occur across the device, thus simplifying the circuits required by embodiments of the present invention.

In the case of 802.3.af, power is delivered via the center tap of the transmit transformer and receive signal transformers for transformer based designs. The embodiments of the present invention may take up to 400 ma DC from the common mode of the signal pair without disturbing the AC (1 MHz-100 MHz) differential signals on the transmit/receive pairs.

Embodiments of the present invention are operable to support PoE side applications as well. As several functions are integrated together, the entire IC ground will track the Ethernet line ground. This means that the IC potential will vary significantly (1500V) from the chassis ground. As no power is necessary from the local supply, the voltage drop will occur across an air gap.

Figure 1B:
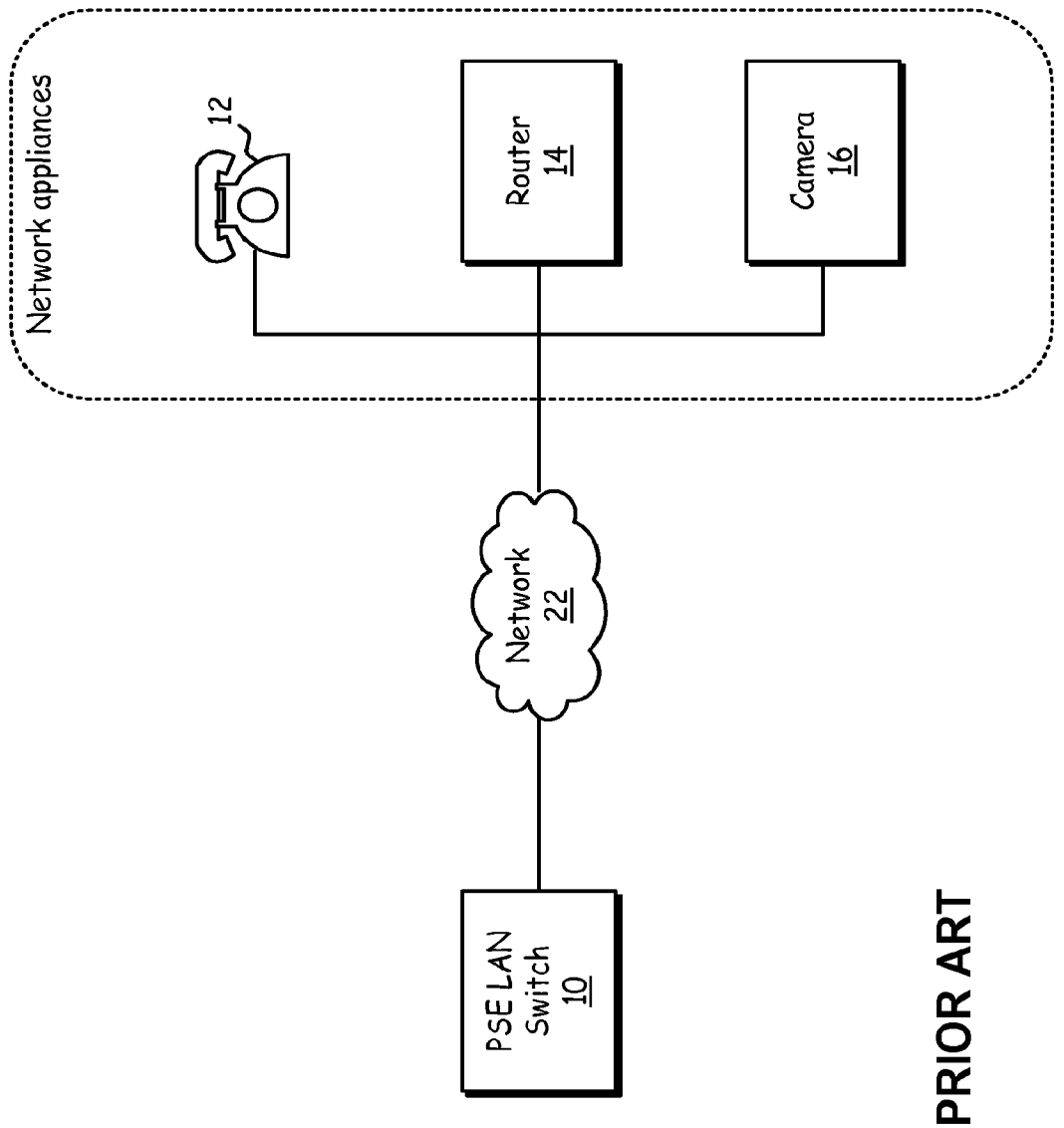
FIG. 1B depicts various Ethernet network powered devices (PDs) in accordance with embodiments of the present invention.

FIG. 1A illustrates exemplary devices where power is supplied separately to network attached client devices 12-16 that may benefit from receiving power and data via the network connection. These devices are serviced by LAN switch 10 for data. Additionally, each client device 12-16 has separate power connections 18 to electrical outlets 20. FIG. 1B illustrates exemplary devices where switch 10 is a power supply equipment (PSE) capable power-over Ethernet (PoE) enabled LAN switch that provides both data and power signals to client devices 12-16. The network attached devices may include VOIP telephone 12, access points, routers, gateways 14 and/or security cameras 16, as well as other known network appliances. This eliminates the need for client devices 12-16 to have separate power connections 18 to electrical outlets 20 as shown in FIG. 1A which are no longer required in FIG. 1B. Eliminating this second connection ensures that the network attached device will have greater reliability when attached to the network with reduced cost and facilitated deployment.

Figure 2A:
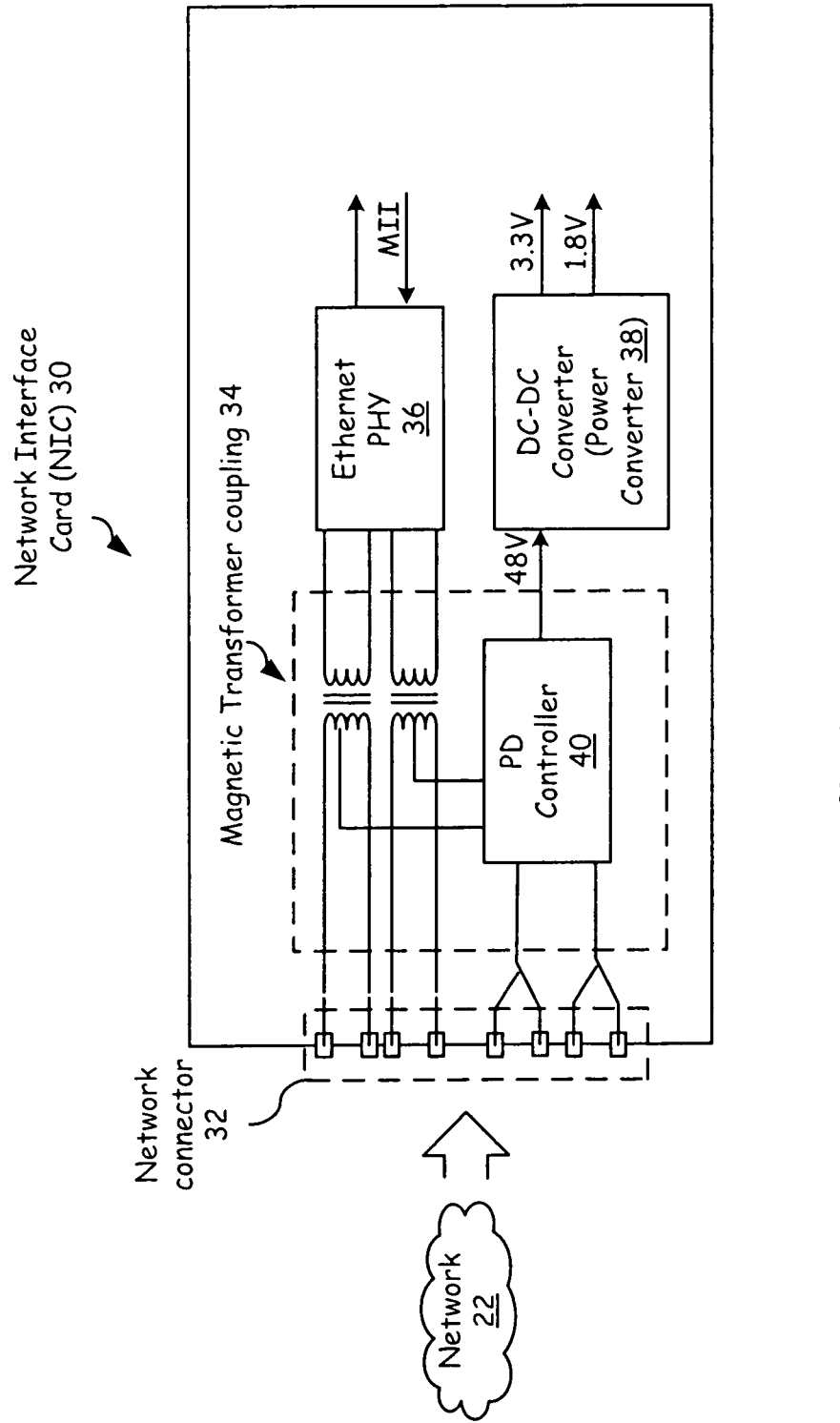
FIG. 2A shows a traditional real-estate intensive transformer based Network Interface Card (NIC)

FIG. 2A provides a typical prior art network interface card 30 for a PD that includes network connector 32, magnetic transformer 34, Ethernet PHY 36, power converter 38, and PD controller 40. Typically, these elements are all separate and discrete devices. Embodiments of the present invention are operable to eliminate the magnetic network transformer 34 and replace this discrete device with a power feed circuit. This power feed circuit may be implemented within an integrated circuit (IC) or as discrete components. Additionally, embodiments of the present invention may incorporate other functional specific processors, or any combination thereof into a single IC.

Figure 2B:
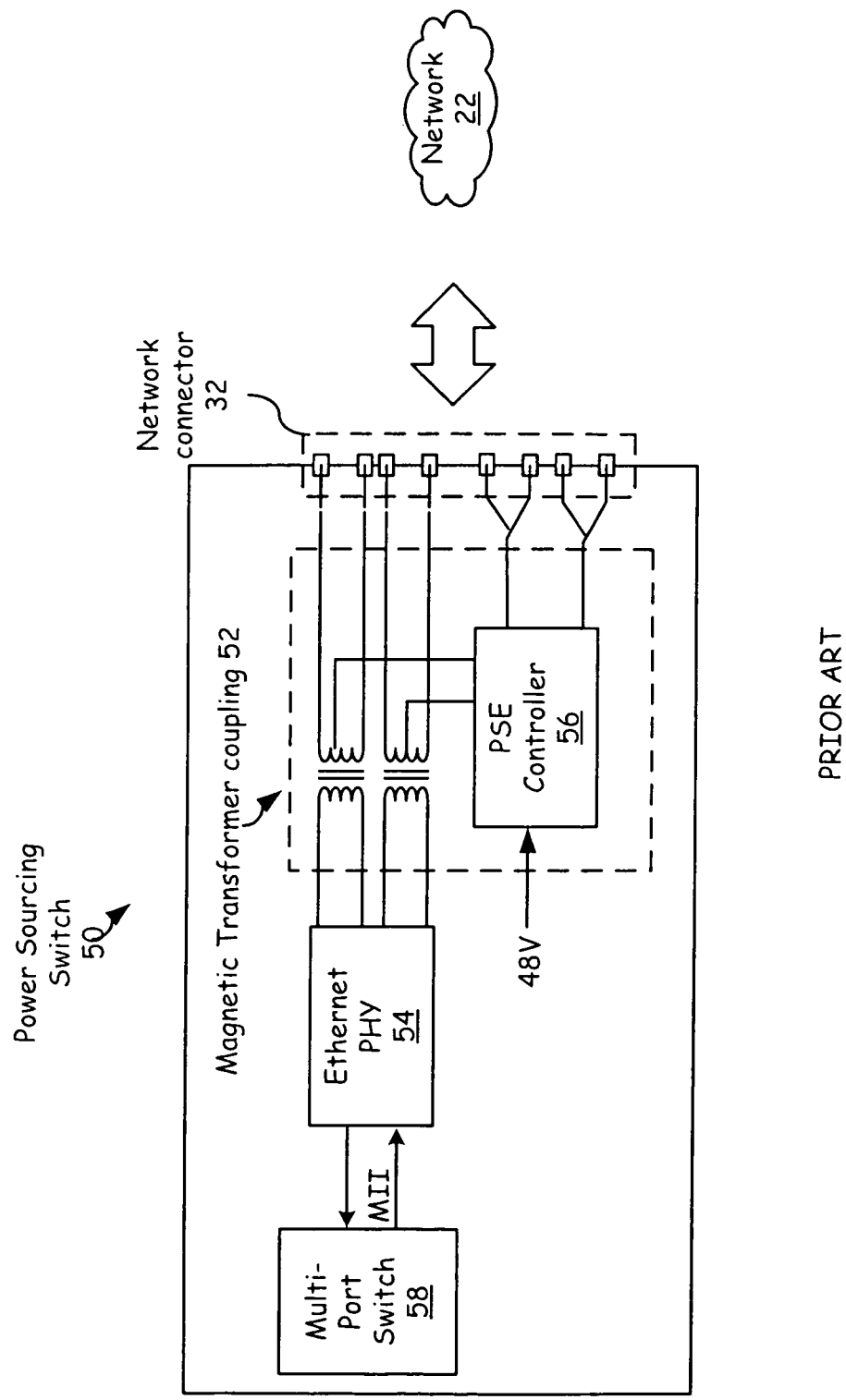
FIG. 2B provides a traditional functional block diagram of magnetic-based transformer power supply equipment (PSE)

FIG. 2B provides a typical PSE prior art device. Here, power sourcing switch 50 includes a network connector 32, magnetically coupled transformer 52, Ethernet physical layer 54, PSE controller 56, and multi-port switch 58. Typically these elements are all separate and discreet devices. Embodiments of the present invention are operable to eliminate the magnetically coupled transformer 52 and replace this transformer with discreet devices that may be implemented within ICs or as discreet devices.

Although the description herein may focus and describe a system and method for coupling high bandwidth data signals and power distribution between the IC and cable that uses transformer-less ICs with particular detail to the 802.3af Ethernet standard, these concepts may be applied in non-Ethernet applications and non 802.3af applications. Further, these concepts may be applied in subsequent standards that supersede the 802.3af standard.

Embodiments of the present invention may provide solid state (non-magnetic) transformer circuits operable to couple high bandwidth data signals and power signals with new mixed-signal IC technology in order to eliminate cumbersome, real-estate intensive magnetic-based transformers 34 and 52 as pictured in FIGS. 2A and 2B.

Modern communication systems use transformers 34 and 52 to provide common mode signal blocking, 1500 volt isolation, and AC coupling of the differential signature as well as residual lightning or electromagnetic shock protection. These functions are replaced by a solid state or other like circuits in accordance with embodiments of the present invention wherein the circuit may couple directly to the line and provide high differential impedance and low common mode impedance. High differential impedance allows separation of the PHY signal form the power signal. The low common mode impedance removes the need for a choke. This allows power to be tapped from the line. The local ground plane may float in order to eliminate the need for 1500 volt isolation. Additionally through a combination of circuit techniques and lightning protection circuitry, it is possible to provide voltage spike or lightning protection to the network attached device. This eliminates another function performed by transformers in traditional systems or arrangements. It should be understood that the technology may be applied anywhere where transformers are used and should not be limited to Ethernet applications.

Specific embodiments of the present invention may be applied to various powered network attached devices or Ethernet network appliances. Such appliances include, but are not limited to VoIP telephones, routers, printers, and other like devices known to those having skill in the art. Such exemplary devices are illustrated in FIG. 1B.

Figure 3A:
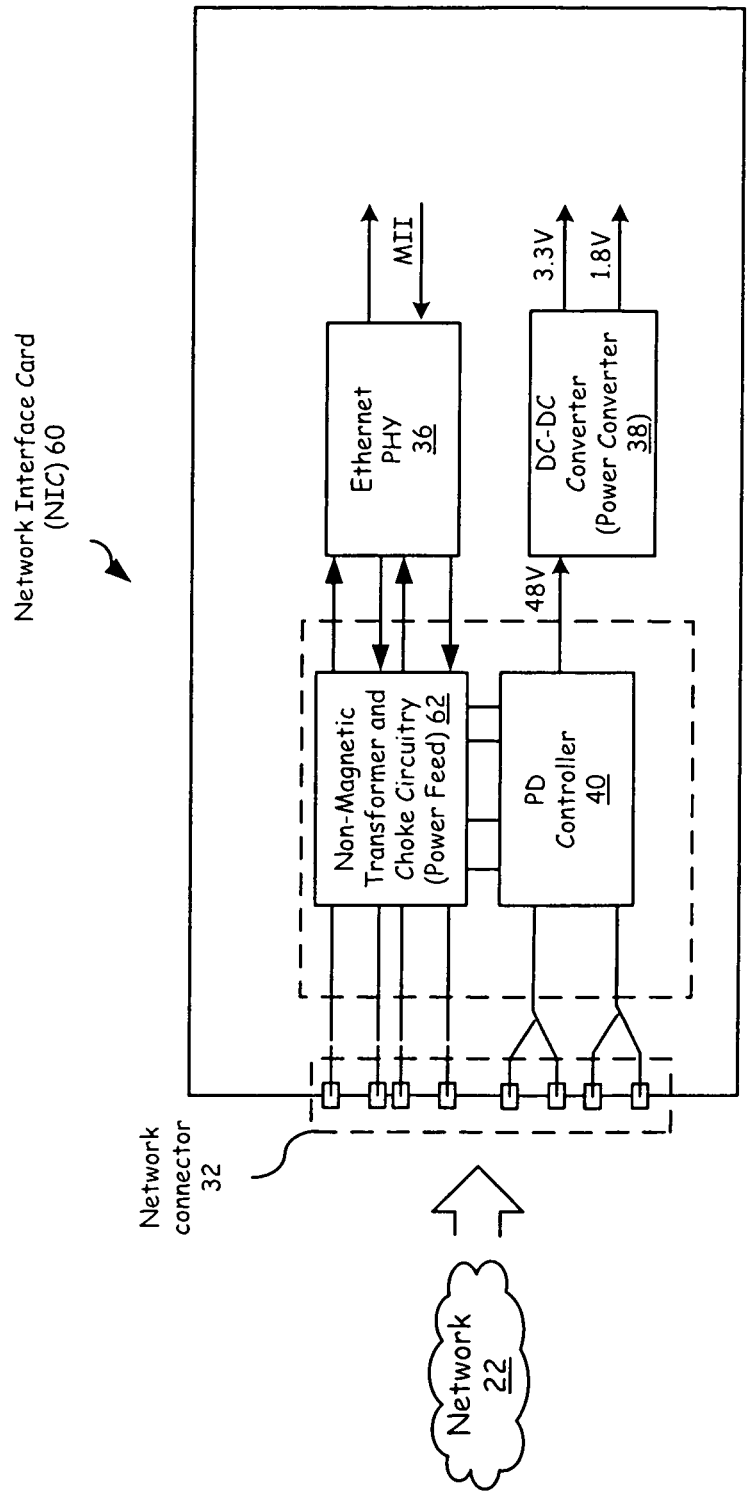
FIG. 3A provides a functional block diagram of a network powered device interface utilizing non-magnetic transformer and choke circuitry in accordance with embodiments of the present invention.

FIG. 3A is a functional block diagram of a network interface 60 that includes network connector 32, non-magnetic transformer and choke power feed circuitry 62, network physical layer 36, and power converter 38. Thus, FIG. 3A replaces magnetic transformer 34 with circuitry 62. In the context of an Ethernet network interface, network connector 32 may be a RJ45 connector operable to receive a number of twisted pairs. Protection and conditioning circuitry may be located between network connector 32 and non-magnetic transformer and choke power feed circuitry 62 to provide surge protection in the form of voltage spike protection, lighting protection, external shock protection or other like active functions known to those having skill in the art. Conditioning circuitry may take the form of a diode bridge or other like rectifying circuit. Such a diode bridge may couple to individual conductive lines 1-8 contained within the RJ45 connector. These circuits may be discrete components or an integrated circuit within non-magnetic transformer and choke power feed circuitry 62.

In an Ethernet application, the 802.3af standard (PoE standard) provides for the delivery of power over Ethernet cables to remotely power devices. The portion of the connection that receives the power may be referred to as the powered device (PD). The side of the link that provides the power is referred to as the power sourcing equipment (PSE). Two power feed options allowed in the 802.3af standard are depicted in FIG. 4A. In the first alternative, which will be referred to as alternative A, LAN switch 70, which contains PSE 76 feeds power to the Ethernet network attached device (PD) 72 along the twisted pair cable 74 used for the 10/100 Ethernet signal via the center taps 80 of Ethernet transformers 82. On the line side of the transfer, transformers 84 deliver power to PD 78 via conductors 1 and 2 and the center taps 86 and return via conductors 3 and 6 and the center taps 86. In the second alternative, conductors 4, 5, 7 and 8 are used to transmit power without transformers. Conductors 4, 5, 7 and 8 remain unused for 10/100 Ethernet data signal transmissions. FIG. 4B depicts that the network interface of FIG. 3A and power sourcing switch of FIG. 3B may be used to implements these alternatives and their combinations as well.

Returning to FIG. 3A, conductors 1 through 8 of the network connector 32, when this connector takes the form of an RJ45 connector, couple to non-magnetic transformer and choke power feed circuitry 62 regardless of whether the first or second alternative provided by 802.3af standard is utilized. These alternatives will be discussed in more detail with reference to FIGS. 4A and 4B. Non-magnetic transformer and choke power feed circuitry 62 may utilize the power feed circuit and separates the data signal portion from the power signal portion. This data signal portion may then be passed to network physical layer 36 while the power signal is passed to power converter 38.

In the instance where network interface 60 is used to couple the network attached device or PD to an Ethernet network, network physical layer 36 may be operable to implement the 10 Mbps, 100 Mbps, and/or 1 Gbps physical layer functions as well as other Ethernet data protocols that may arise. The Ethernet PHY 36 may additionally couple to an Ethernet media access controller (MAC). The Ethernet PHY 36 and Ethernet MAC when coupled are operable to implement the hardware layers of an Ethernet protocol stack. This architecture may also be applied to other networks. Additionally, in the event that a power signal is not received but a traditional, non-power Ethernet signal is received the nonmagnetic power feed circuitry 62 will still pass the data signal to the network PHY.

The power signal separated from the network signal within non-magnetic transformer and choke power feed circuit 62 by the power feed circuit is provided to power converter 38. Typically the power signal received will not exceed 57 volts SELV (Safety Extra Low Voltage). Typical voltage in an Ethernet application will be 48-volt power. Power converter 38 may then further transform the power as a DC to DC converter in order to provide 1.8 to 3.3 volts, or other voltages as may be required by many Ethernet network attached devices.

Figure 3B:
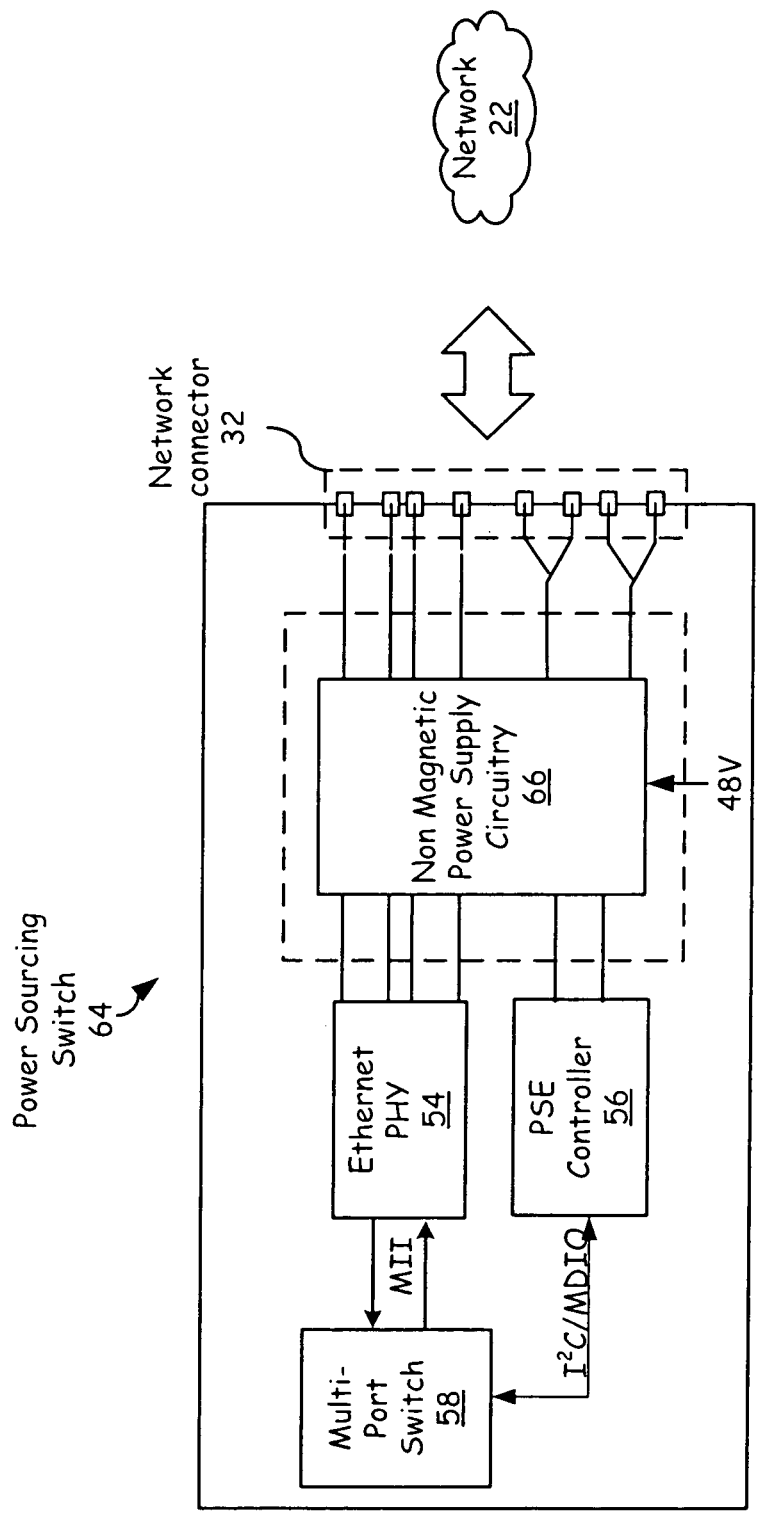
FIG. 3B provides a functional block diagram of a PSE utilizing non-magnetic transformer and choke circuitry in accordance with embodiments of the present invention.
Figure 4A:
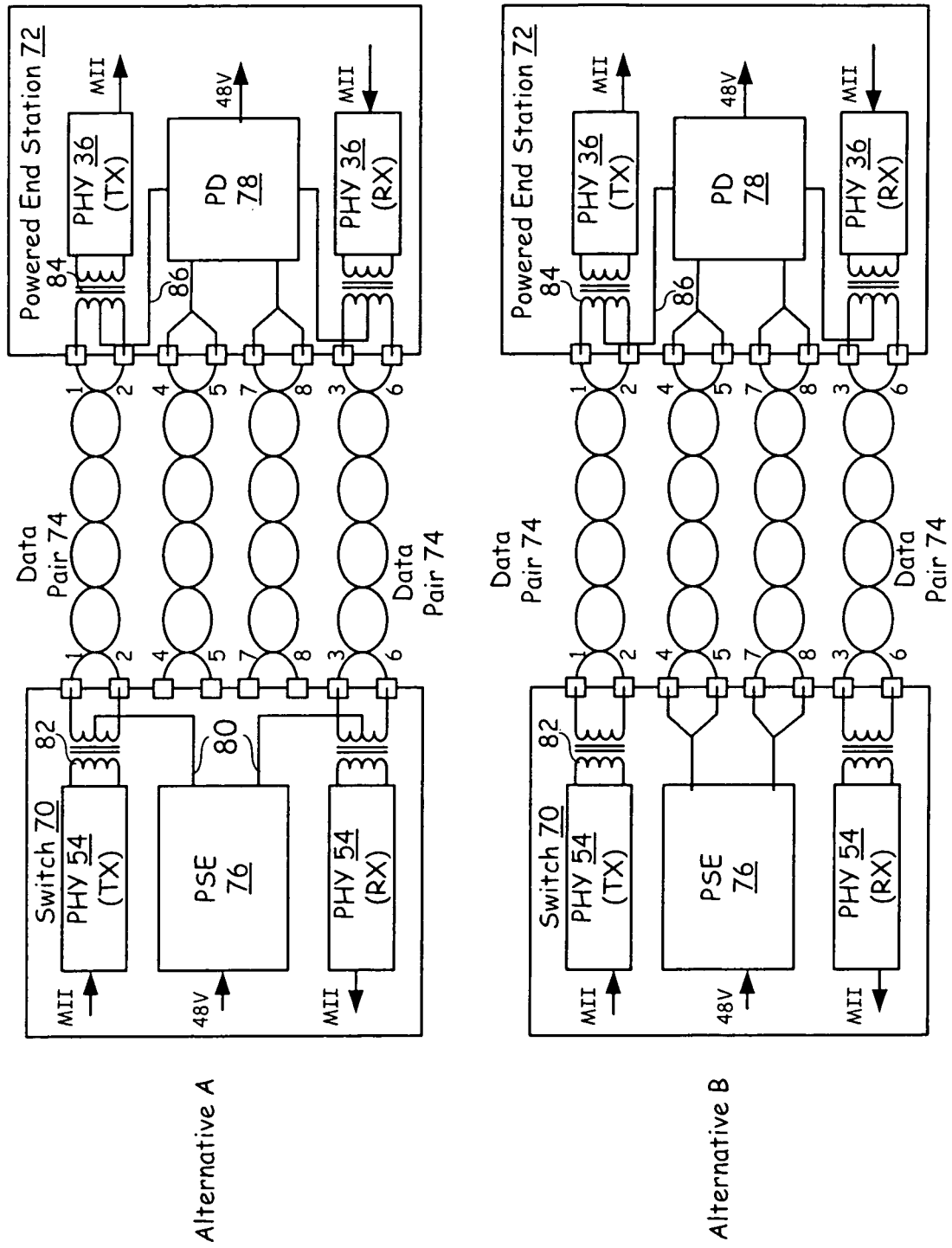
FIG. 4A illustrates two allowed power feeding schemes per the 802.3af standard.
Figure 4B:
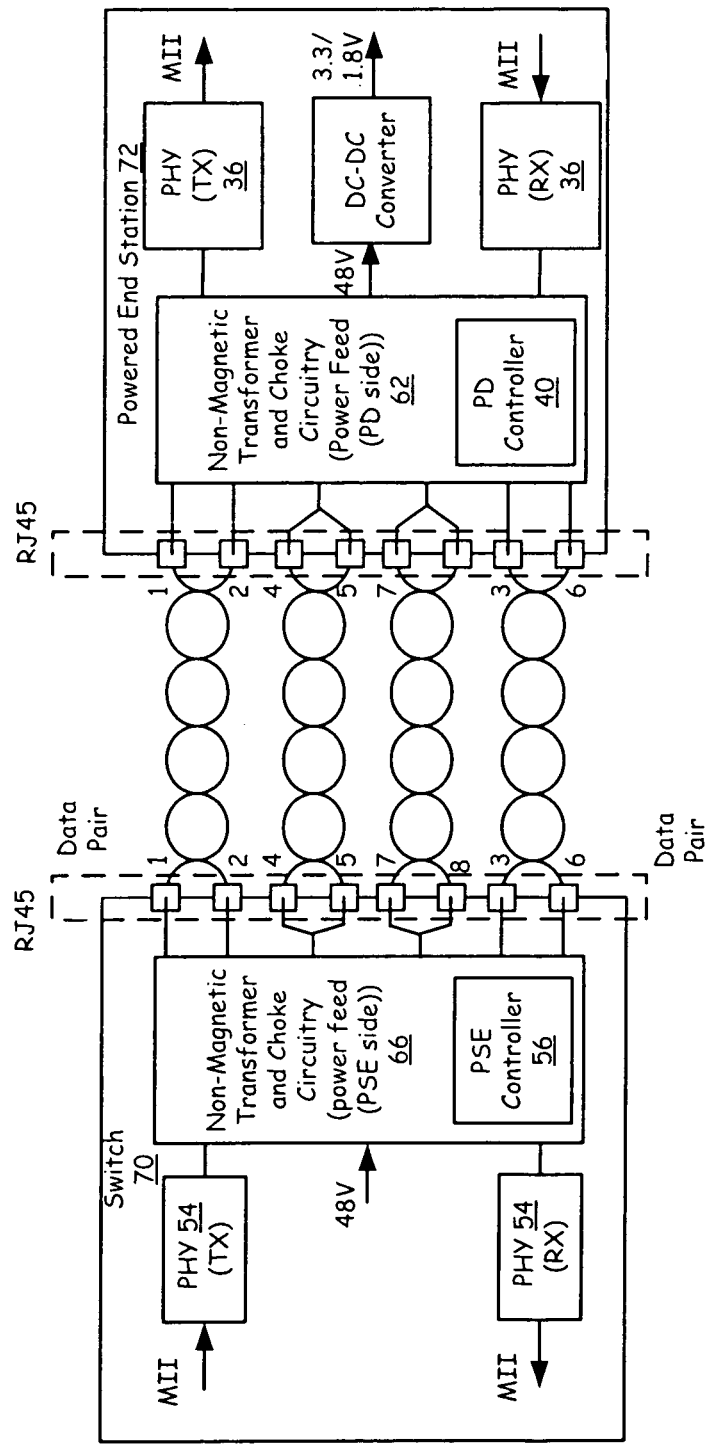
FIG. 4B illustrates the use of embodiments of the present invention to deliver both the power feeding schemes illustrated with FIG. 4A allowed per the 802.3af standard.

FIG. 3B is a functional block diagram of a power-sourcing switch 64 that includes network connector 32, Ethernet or network physical layer 54, PSE controller 56, multi-port switch 58, and non-magnetic transformer and choke power supply circuitry 66. FIG. 3B is similar to that provided in FIG. 2B, wherein the transformer has been replaced with non-magnetic transformer and choke power supply circuitry 66. This power-sourcing switch may be used to supply power to network attached devices in place of the power source equipment disclosed in FIG. 2B.

Network interface 60 and power sourcing switch 64 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All of these may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other like networks known to that having skill in the art. Other embodiments may supply power to network attached devices over alternative networks such as but not limited to a HomePNA local area network and other like networks known to those having skill in the art. The HomePNA uses existing phone wires to share a single network connection within a home or building. Alternatively, embodiments of the present invention may be applied where network data signals are provided over power lines.

Non-magnetic transformer and choke power feed circuitry 62 and 66 eliminate the use of magnetic transformers with integrated system solutions that provide the opportunity to increase system density by replacing magnetic transformers 34 and 52 with solid state power feed circuitry in the form of an IC or discreet component.

Figure 5A:
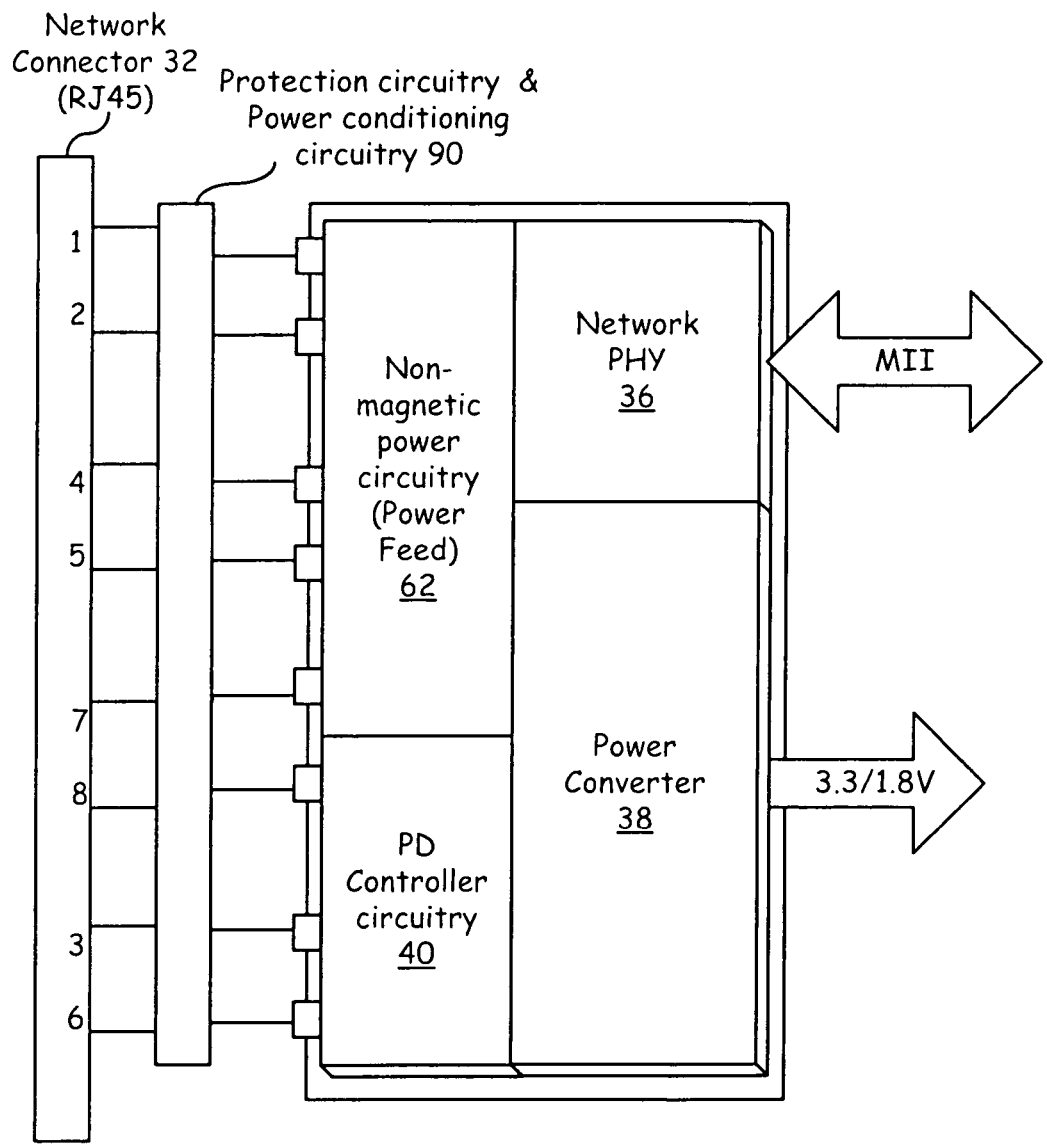
FIG. 5A shows an embodiment of a network powered device (PD) in accordance with an embodiment of the present invention that integrates devices at the IC level for improved performance.
Figure 5B:
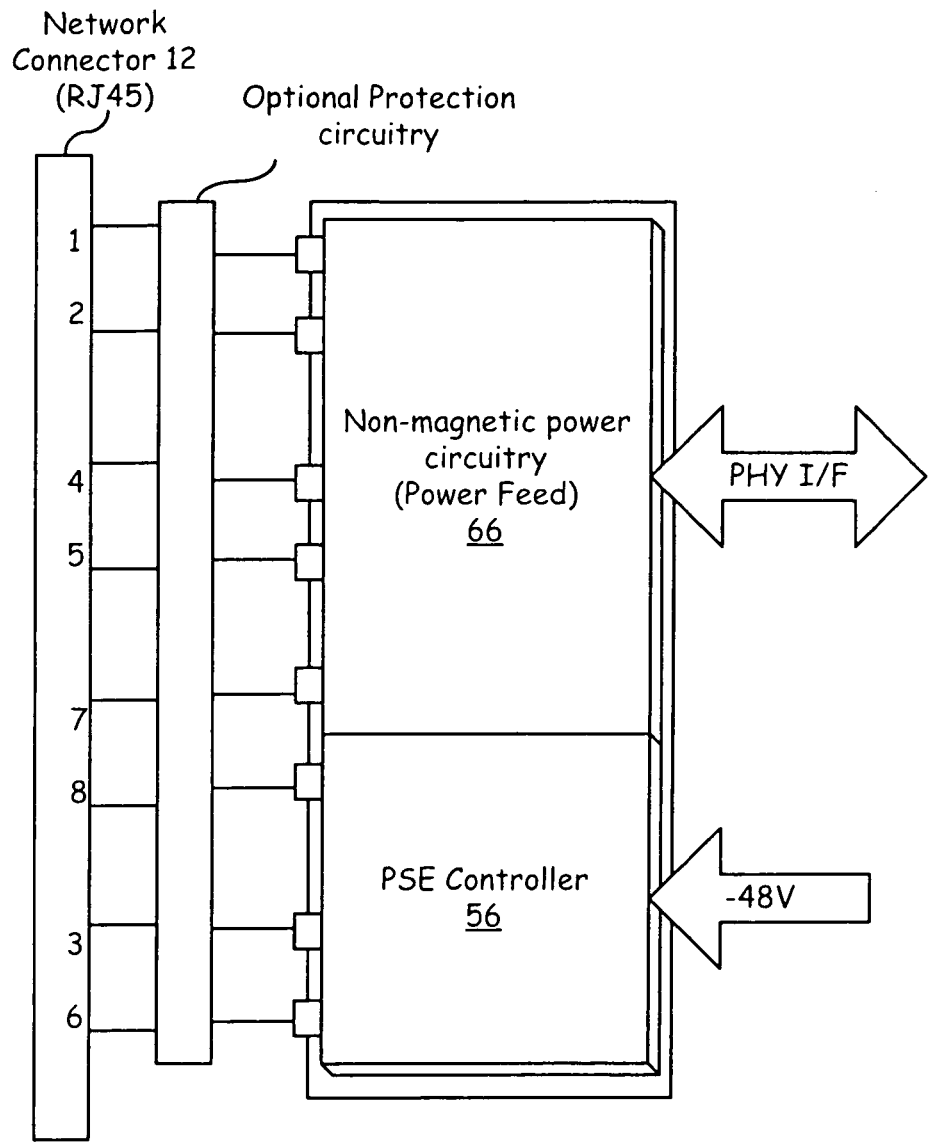
FIG. 5B shows an embodiment of a power source equipment (PSE) network device in accordance with an embodiment of the present invention that integrates devices at the IC level for improved performance.

FIG. 5A provides an illustration of an embodiment wherein the non-magnetic transformer and choke power feed circuitry 62, network physical layer 36, power distribution management circuitry 54, and power converter 38 are integrated into a single integrated circuit as opposed to being discrete components at the printed circuit board level. Optional protection and power conditioning circuitry 90 may be used to interface the IC to the network connector.

The Ethernet PHY may support the 10/100/1000 Mbps data rate and other future data networks such as a 10000 Mbps Ethernet network. The non-magnetic transformer and choke power feed circuitry 62 will supply the line power minus the insertion loss directly to the power converter 38. This will convert the power first to a 12 v supply, then subsequently to the lower supply levels. This circuit may be implemented in the 0.18 or 0.13 micron process or other like process known to those having skill in the art.

The non-magnetic transformer and choke power feed circuitry 62 implements three main functions: 802.3.af signaling and load compliance, local unregulated supply generation with surge current protection and signal transfer between the line and integrated Ethernet PHY. As the devices are directly connected to the line, the circuit may be required to withstand a secondary lightning surge.

In order for the PoE to be 802.3af standard compliant, the PoE may be required to be able to accept power with either power feeding schemes illustrated in FIGS. 4A and 4B and handle power polarity reversal. A rectifier, such as a diode bridge, or a switching network, may be implemented to ensure power signals having an appropriate polarity are delivered to the nodes of the power feed circuit. Any one of the conductors 1, 4, 7 or 3 of the network RJ45 connection can forward bias to deliver current and any one of the return diodes connected can forward bias provide a return current path via one of the remaining conductors. Conductors 2, 5, 8 and 4 are connected in a similar fashion.

The non-magnetic transformer and choke power feed circuitry when applied to PSE may take the form of a single or multiple port switch in order to supply power to single or multiple devices attached to the network. FIG. 3B provides a functional block diagram of power sourcing switch 64 operable to receive power and data signals and then combine these with power signals, which are then distributed via an attached network. In the case where power sourcing switch 64 is a gateway or router, a high-speed uplink couples to a network such as an Ethernet network or other like network. This data signal is relayed via network PHY 54 and then provided to non-magnetic transformer and choke power feed circuitry 66. The PSE switch may be attached to an AC power supply or other internal or external power supply in order to provide a power signal to be distributed to network-attached devices that couple to power sourcing switch 64. Power controller 56 within or coupled to non-magnetic transformer and choke power feed circuitry 66 may determine, in accordance with IEEE standard 802.3af, whether or not a network-attached device, in the case of an Ethernet network-attached device, is a device operable to receive power from power supply equipment. When it is determined in the case of an 802.3af compliant PD is attached to the network, power controller 56 may supply power from power supply to non-magnetic transformer and choke power feed circuitry 66, which is then provided to the downstream network-attached device through network connectors, which in the case of the Ethernet network may be an RJ45 receptacle and cable.

The 802.3af Standard is intended to be fully compliant with all existing non-line powered Ethernet network systems. As a result, the PSE is required to detect via a well defined procedure whether or not the far end is PoE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts. At this point the power MOSFETs are enabled and the large bypass capacitor begins to charge.

The maintain power signature is applied in the PoE signature block—a minimum of 10 mA and a maximum of 23.5 kohms may be required to be applied for the PSE to continue to feed power. The maximum current allowed is limited by the power class of the device (class 0-3 are defined). For class 0, 12.95 W is the maximum power dissipation allowed and 400 ma is the maximum peak current. Once activated, the PoE will shut down if the applied voltage falls below 30V and disconnect the power MOSFETs from the line.

The power feed devices in normal power mode provide a differential open circuit at the Ethernet signal frequencies and a differential short at lower frequencies. The common mode circuit will present the capacitive and power management load at frequencies determined by the gate control circuit.

Figure 6A:
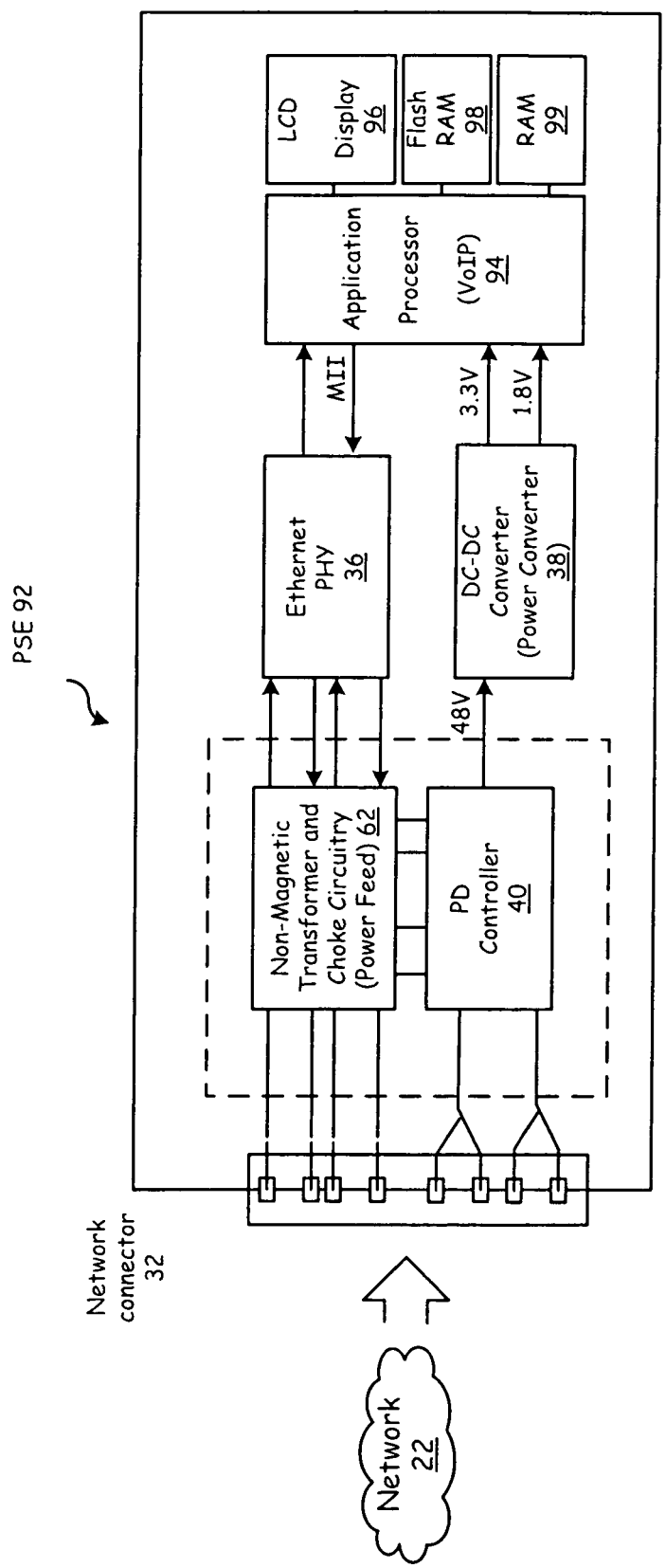
FIG. 6A illustrates the technology associated with embodiments of the present invention as applied in the case of an enterprise VoIP phone for PD applications.

FIG. 6A provides a functional block diagram of a specific network attached appliance 92. In this case, the network attached appliance is a VOIP telephone. Network connector 32 takes form of an Ethernet network connector, such as RJ45 connector, and passes Ethernet signals to power feed circuitry 62 and PD controller 40. Non-magnetic transformer and choke power feed circuitry 62 separates the data signal and power signal. An optional connection to an external isolated power supply allows the network attached device to be powered when insufficient power is available or when more power is required than can be provided over the Ethernet connection. The data signal is provided to network physical layer 36. Network physical layer 36 couples to a network MAC to execute the network hardware layer. An application specific processor, such as VOIP processor 94 or related processors, couples to the network MAC. Additionally, the VOIP telephone processors and related circuitry (display 96 and memory 98 and 99) may be powered by power converter 38 using power fed and separated from the network signal by non-magnetic transformer and choke power feed circuitry 62. In other embodiments, other network appliances, such as cameras, routers, printers and other like devices known to those having skill in the art are envisioned.

Figure 6B:
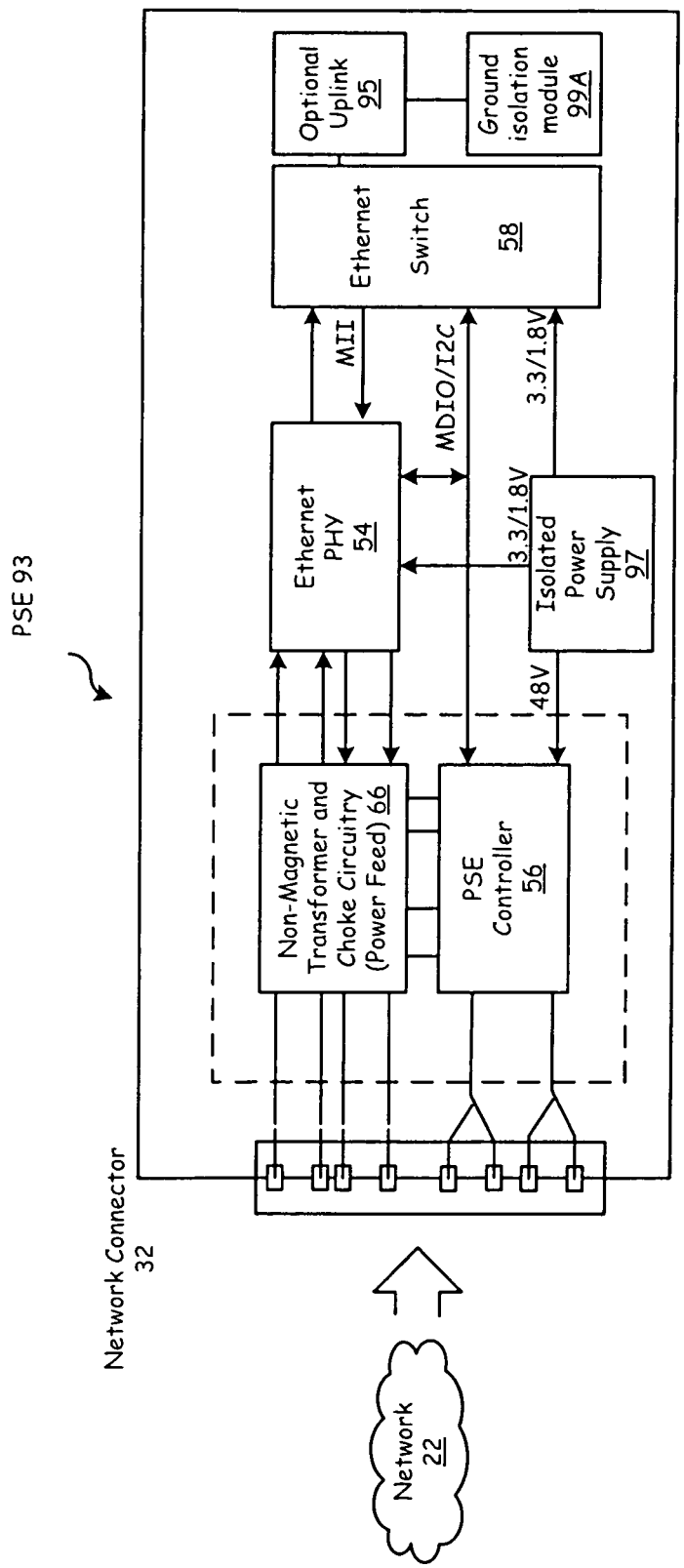
FIGS. 6B-6D illustrates the technology associated with embodiments of the present invention as applied in the case of a network router for PSE applications with different power isolation schemes.
Figure 6C:
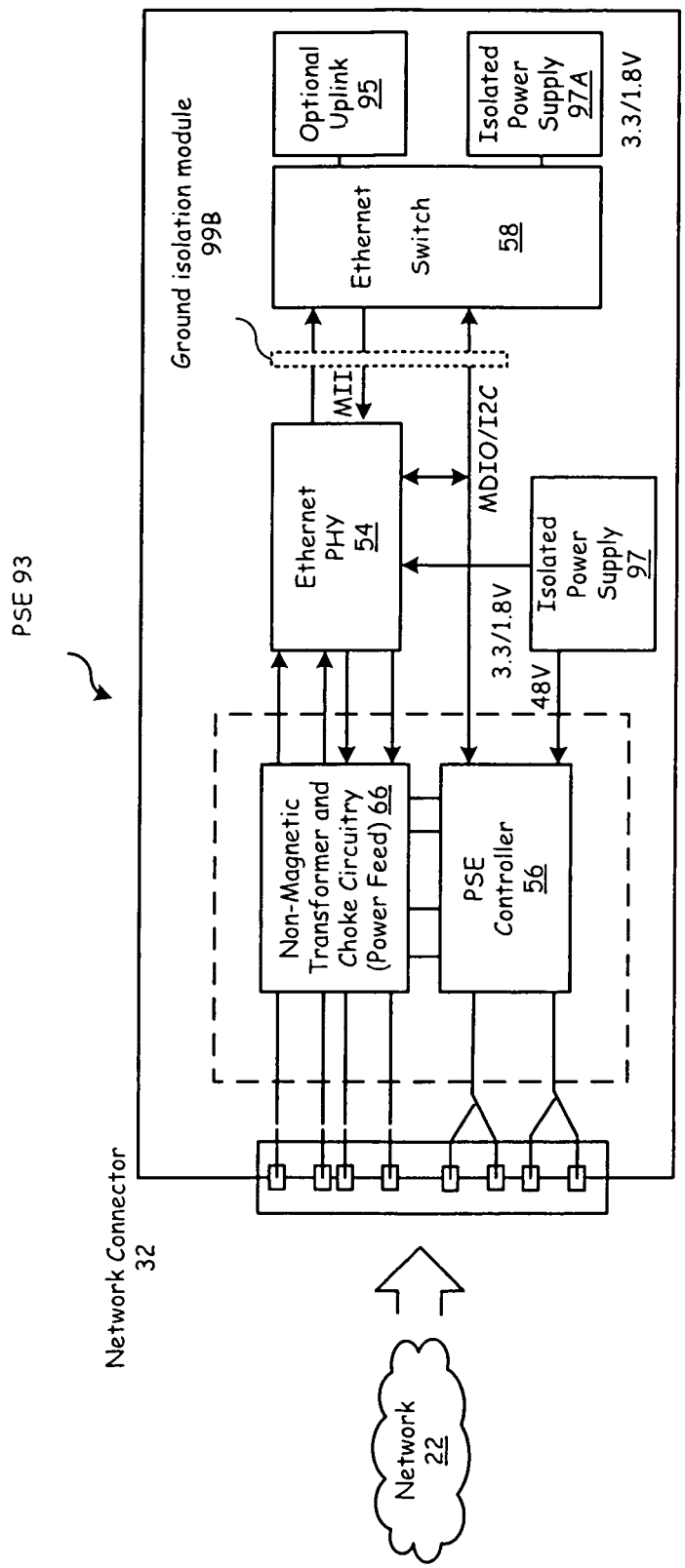

FIG. 6B provides a functional block diagram of a specific network attached PSE device 93. In this embodiment, PSE network device 93 is an Ethernet router. Network connector 32 may take the form of Ethernet network connector such as an RJ-45 connector, and is operable to distribute Ethernet signals that include both power and data as combined by the integrated circuits within PSE 93. PSE 93 includes an integrated circuit, 66, which serves as a nonmagnetic transformer and choke circuit. Various embodiments of the nonmagnetic transformer and choke circuitry will be discussed in further detail with references to FIGS. 7A-7B and 8A-8D. PSE network devise 93 also includes PSE controller 56, Ethernet PHY 54, isolated power supply 97, an Ethernet switch 58, and an optional uplink 95 as shown in FIG. 6C.

Figure 6D:
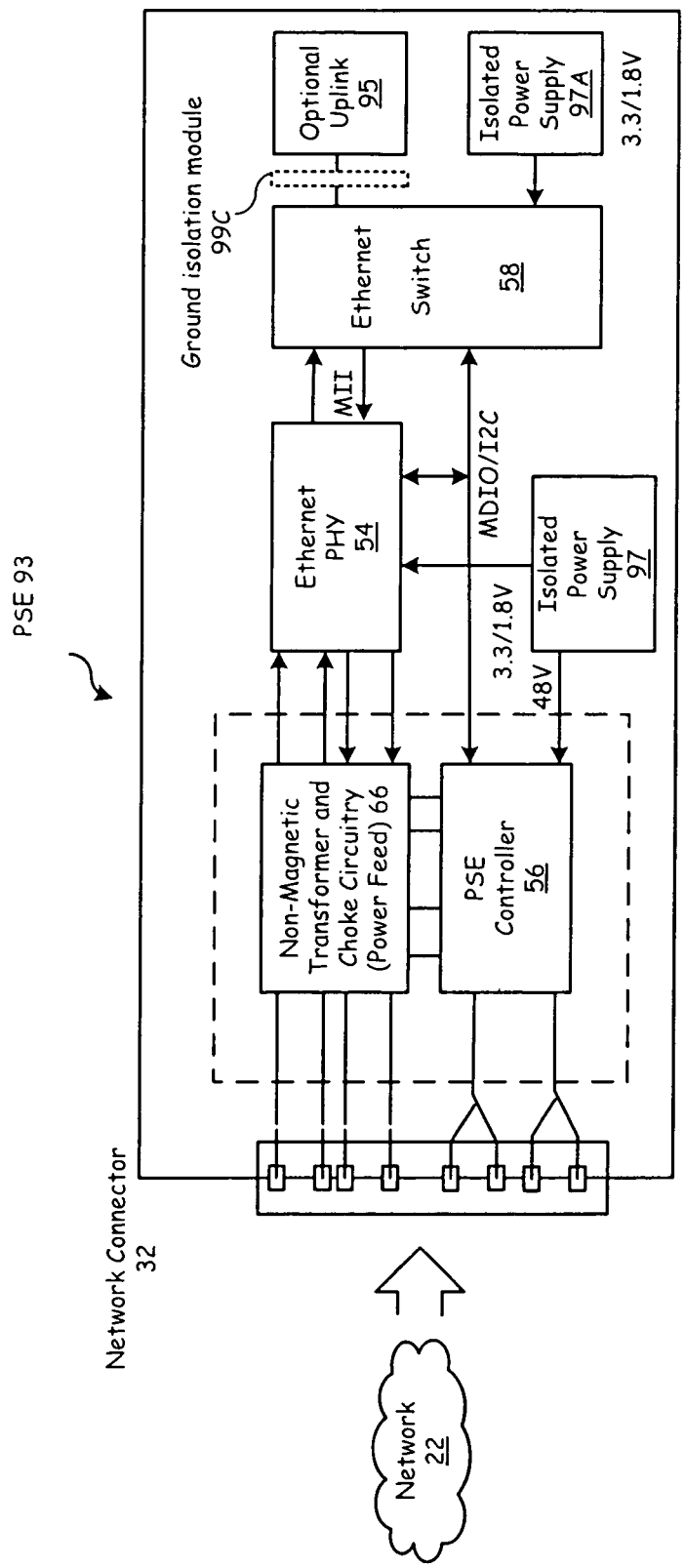

The 1500 volt isolation between earth ground and the PSE network device may be achieved through various means. The data connections may be capacitively isolated, optically isolated or isolated using a transformer as is shown in FIGS. 6B-6D. The power connection is isolated using one or more isolated power supplies as is shown in FIGS. 6B-6D.

The PSE devices may be a single port or multi-port. As a single port this device can also be applied to a mid-span application. Data is provided to Ethernet physical layer 54 either from network devices attached to network connector 32 or data received from an external network via internet switch 58 and uplink 95. Ethernet switch 58 could be an application specific processor or related processors that are operable to couple PSE 93 via uplink 95 to an external network.

PSE devices may be integrated into various switches and routers for enterprise switching applications. However, in non-standard networks e.g. automotive etc., these PSE devices may be integrated into controller for the attached devices. In the case of multimedia or content distribution, these PSE devices may be incorporated into a controller/set-top box that distributes content and power to attached devices.

Nonmagnetic transformer and choke circuitry 66 receives data from Ethernet physical layer 54. Additionally, power is supplied to the nonmagnetic transformer and choke circuitry 66 from isolated power supply 97. In one embodiment this is a 48-volt power supply. However, this power distribution system may be applied to other power distribution systems, such as 110 volt systems as well. PSE controller 56 receives the power signal from isolated power supply 97 and is operable to govern the power signal content within the Ethernet signal supplied by nonmagnetic transformer and choke circuitry 66. For example, PSE controller 56 may limit the Ethernet power signal produced by nonmagnetic transformer and choke circuitry 66 based on the requirements of an attached PD. Thus PSE controller 56 is operable to ensure that attached network PDs are not overloaded and are given a proper power signal. Power supply 97 also supplies as shown a power signal to Ethernet PHY 54, Ethernet switch 58.

The Ethernet switch and optional uplink 95 may be powered by isolated power supply 97 or an optional power supply 97A as shown in FIGS. 6C and 6D. When powered by isolated power supply 97, data ground isolation may be provided at uplink 95 by ground isolation module 99A. When the optional power supply 97A is utilized, the data connection may be isolated using isolation module 99B of FIG. 6C or isolation module 99C of FIG. 6D that employ optical isolation, capacitive isolation or transformers for isolation.

Isolated power supply 97 may be attached to an AC power supply or other internal or external power supply in order to provide a power signal to be distributed to network-attached devices that couple to PSE 93. PSE controller 56 may determine, in accordance with IEEE standard 802.3af, whether or not a network-attached device, in the case of an Ethernet-attached device, is a device operable to receive power from power supply equipment. When it is determined that an 802.3af compliant PD is attached to the network, PSE controller 56 may supply power from power supply 97 to nonmagnetic transformer and choke circuitry 66, which is then provided to the downstream network-attached device through network connectors 32.

The 802.3af Standard is intended to be fully compliant with all existing non-line powered Ethernet systems. As a result, the PSE network device is required to detect via a well defined procedure whether or not the far end network attached device is POE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a POE device is present. During classification the PSE network device applies a voltage between 14.5V and 20.5V, and measures the current to determine the power class of the device.

The PSE network device enters a normal power supply mode after determining that the PD is ready to receive power. At this point the power MOSFETs are enabled. During the normal power supply mode, a maintain power signature is sensed by the PSE to continue supplying power. The maximum current allowed is limited by the power class of the network attached device.

The power feed devices in normal power mode provide a differential open circuit at the Ethernet signal frequencies and a differential short at lower frequencies. The common mode circuit will present the capacitive and power management load at frequencies determined by the gate control circuit.

In detection/classification and disconnect modes, the power transistors within the IC may be disabled to prevent the loading of the PSE detection circuitry.

Figure 7A:
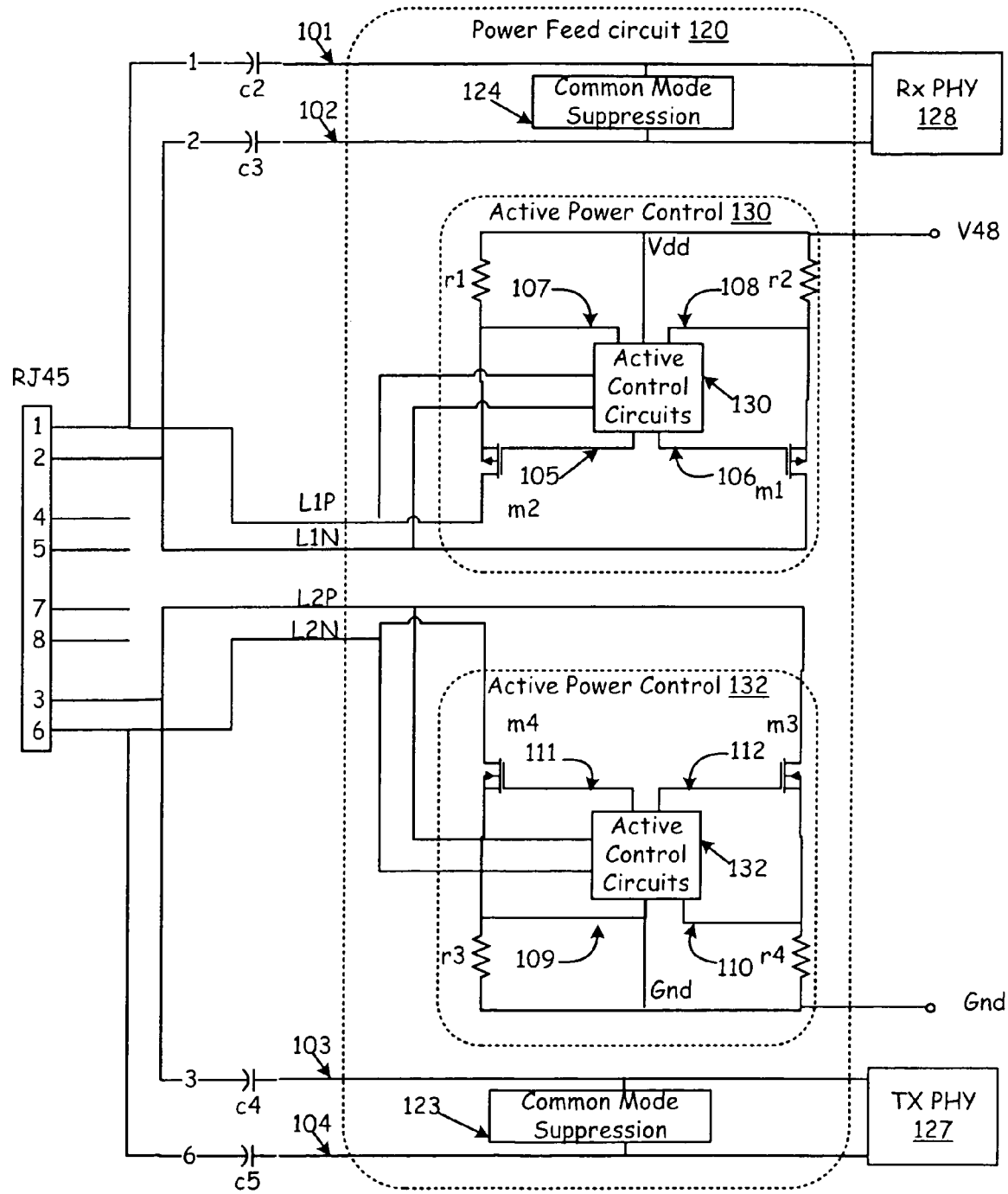
FIGS. 7A-7B illustrate various embodiments of a power feed circuit in accordance with embodiments of the present invention.
Figure 7B:
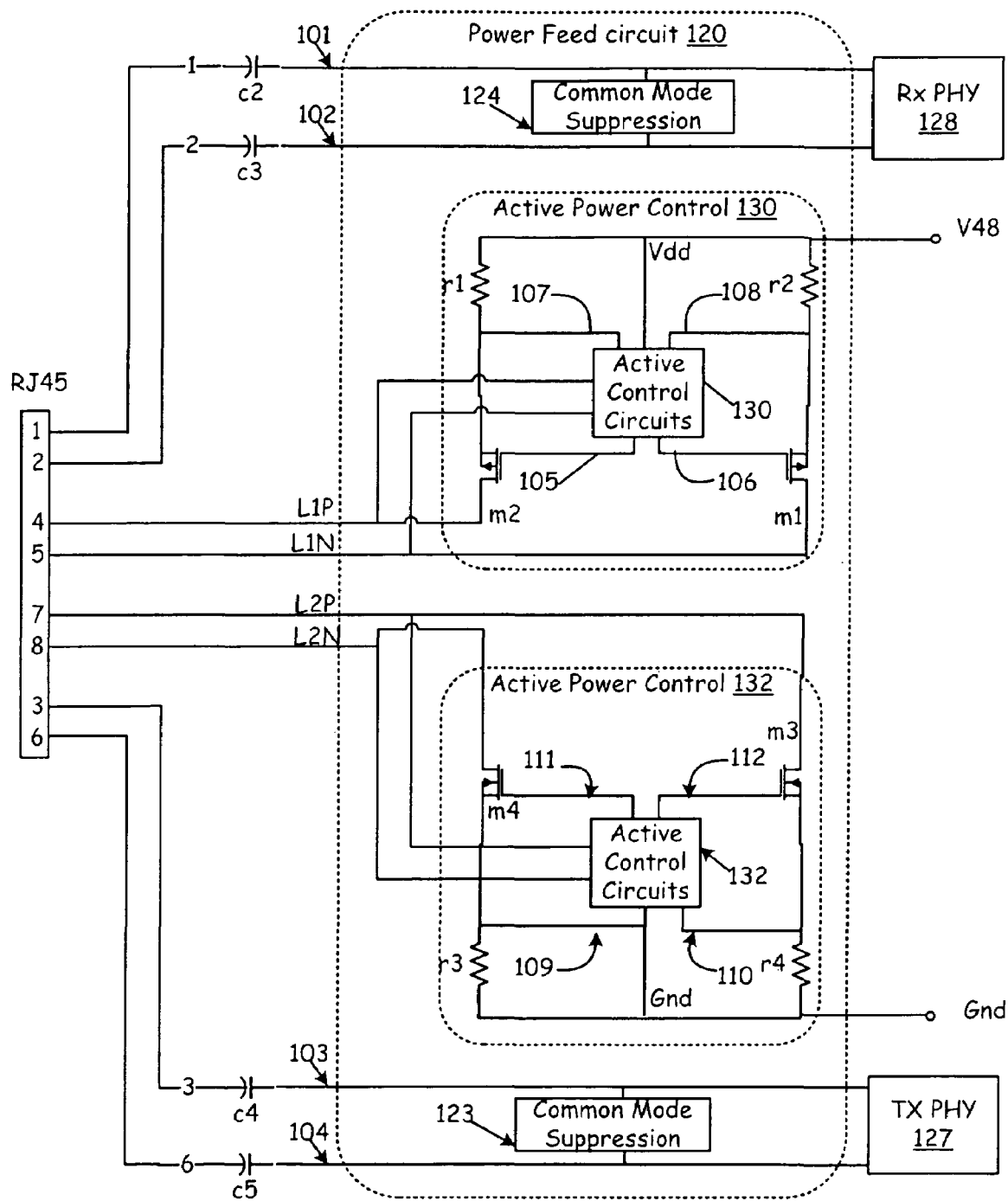

Additional circuits may be used to implement specific functions in accordance with various embodiments of the present invention. Various embodiment of power feed circuits within a PSE are provided in FIGS. 7A-7B. FIG. 7A contains a power feed circuit 120 located within non-magnetic transformer and choke power feed circuitry 66. The Ethernet network (network) power signal produced complies with alternative A. FIG. 7B depicts a power feed circuit located within non-magnetic transformer and choke power feed circuitry 66 that produces a power signal that complies with alternative B. Other embodiments are possible and will be discussed with reference to FIGS. 8A-8D wherein the various embodiments may comply with alternative A and/or alternative B of 802.3af as well as the POE plus standard for higher power applications. The resultant Ethernet signal may be provided via a network connector 32, such as the RJ45 connector.

Power is supplied to differential transistor pairs within the non-magnetic transformer and choke power feed circuitry 66 from power supply 97. Power supply 97 may couple to the 48 volt node and ground node within power feed circuit 120 of FIGS. 7A and 7B. Active control circuits 125 and 126 may sense the source voltage at the individual transistors via circuit pathways 107 and 108. Additionally, active control circuits 125 and 126 may sense the drain voltage along line from nodes L1P, L1N, L2P and L2N. This allows the active control circuit 125 and 126 to generate control signals 105, 106, 111 and 112 which are applied to the gates of the transistors. For example, control signals 105 and 106 may be applied to the gates of differential transistors M2 and M1 respectively. By sensing these voltages, the active control circuits may balance the power supplied by any individual transistor. Comparing the differential voltage seen as the source of transistors M1 and M2, shown as signals 107 and 108 respectively allows active control circuit 125 to adjust the gate currents 105 and 106 to balance the current passed by transistors M1 and M2. In other instances, should an open circuit condition result or a failure of an individual transistor or pathway occur, the active control circuits may allow the remaining transistor and circuit elements to pass a reduced power signal without overloading the remaining circuit elements. Previous solutions would have resulted in an overload condition or power delivery shutdown.

Individual power signals are provided on L1P, L1N, L2P, L2N and may combine with data signals supplied on lines 101, 102, 103 and 104 by PHY 128 and 127. The combined Ethernet signal that contains both data and power is provided over twisted pairs (1, 2) and (3, 6) of the RJ-45 connector in accordance with Alternative A on 802.3af standard.

The power signal is provided at the input nodes V48 and Gnd of active power control modules 130 and 132. L1N and L1P on the receive side and on the transmit side L2N and L2P of the power feed circuit provide the power signal to the network connector. The differential transistor pairs are shown as pairs M1 and M2 in active power control module 130 and as M3 and M4 in active power control module 132. Individual Ethernet power signals pass through differential transistor pairs M1 or M2 on the receive side and M3 and M4 on the transmit side. The transistors shown may be MOSFET transistors, bipolar transistors, or other like transistors known to those having skill in the art. The power signal received from the power supply input nodes pass through sense impedance such as resistor R1 and R2 on the receive side or R3 and R4 on the transmit side. The voltage drop across these impedances is used as an input to the active control circuits to balance these circuits.

Active control circuits 125 and 126 may ensure that the power signals passed through the transistors are of equal magnitude or balanced based on other criteria. Active control circuits 125 and 126 are operable to provide common mode suppression, insertion loss control, and current balancing by controlling the gate by control signals 105, 106, 111 and 112 which are applied to the gates of differential transistors M1, M2, M3 and M4. Additionally, the active control circuits may provide temperature and load control, or other signal conditioning functions.

Figure 8A:
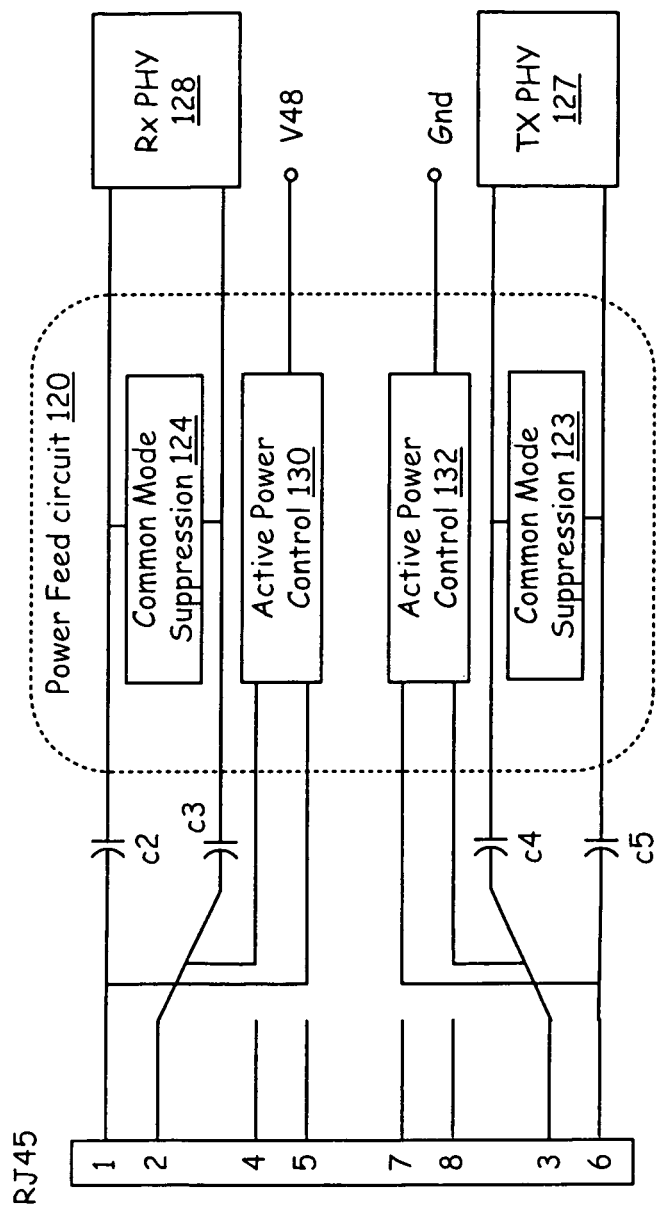
FIGS. 8A-8E illustrate various embodiments of a power feed circuit in accordance with embodiments of the present invention that are operable to support various data rates and power requirements and multiple cable pairs.
Figure 8B:
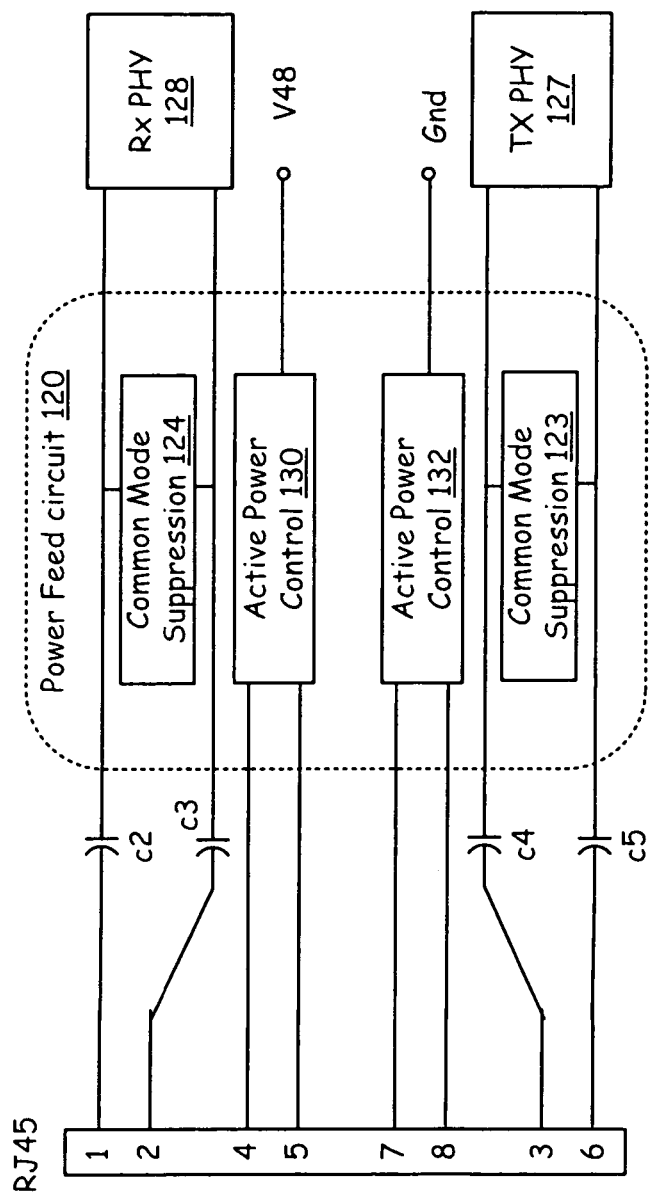

FIGS. 8A through 8E illustrate various configurations of common mode suppression and active power control circuits that are compliant with Alternative A, Alternative B, and/or POE Plus, and that may support various data rates up to and including gigabyte Ethernet. FIG. 8A shows an embodiment where the upper power feed circuit 120 utilizes a single pair of active power control circuits 130 and 132 that supply power over twisted pairs (1, 2) and (3, 6) where twisted pairs (4, 5) and (7, 8) are not used for power and/or data. Thus this first embodiment is compliant with alternative A. The second embodiment presented in FIG. 8B is complaint with alternative B where Ethernet data signals are provided on twisted pairs (1, 2) and (3, 6) while power is provided on twisted pairs (4, 5) and (7, 8). Individual twisted pairs in this embodiment are used only to supply power or data but not both.

Figure 8C:
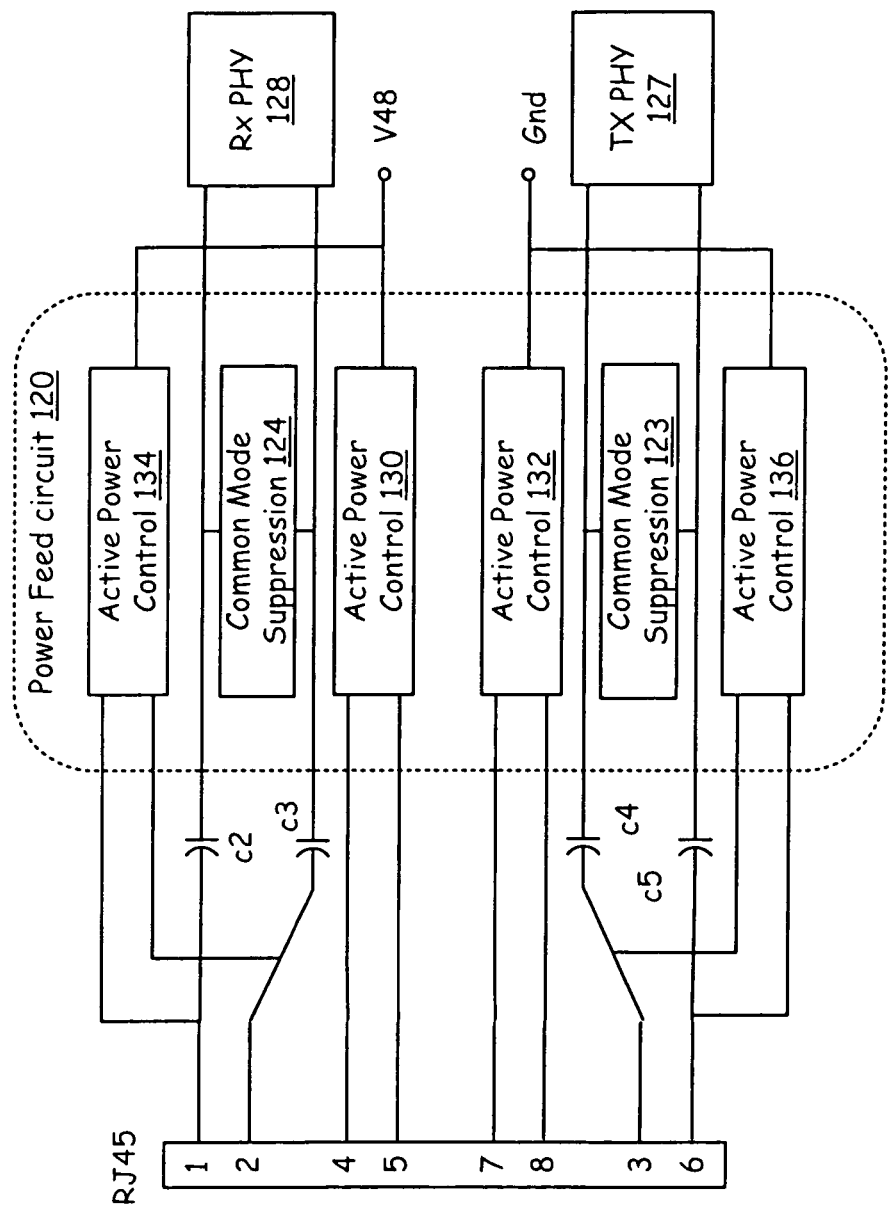

In FIG. 8C the ability to deliver power over the Ethernet connection is increased by having the ability to deliver power with additional active power control modules circuits 134 and 136 over the twisted pairs (4, 5) and (7, 8). It should be noted that power only is provided over twisted pairs (4, 5) and (7, 8). This effectively allows the power supply under Alternative A or Alternative B to be doubled.

Figure 8D:
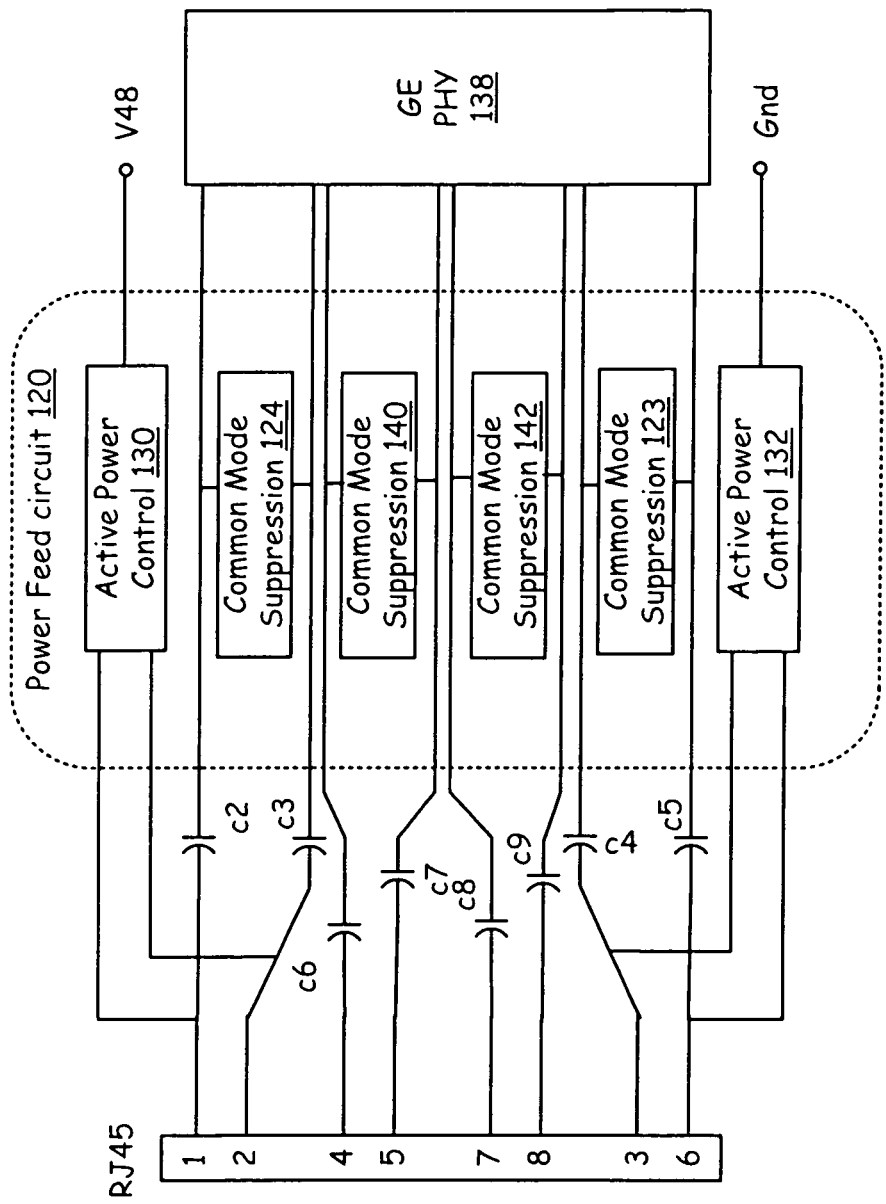

FIG. 8D increases the data supply with a PHY 138 operable support gigabyte Ethernet. In this instance twisted pairs (1, 2) are used to supply power and data from power supplied by active power control 130. Similarly active power control 132 provides power over twisted pair (3, 6). Additionally, in order to support increased data rates (i.e. gigabit Ethernet), twisted pairs (1, 2), (3, 6), (4, 5) and (7, 8) all are used to supply data as well. This involves the addition of common mode suppression circuits 140 and 142 and associated blocking capacitors C2 through C9 in order to supply Ethernet data.

Figure 8E:
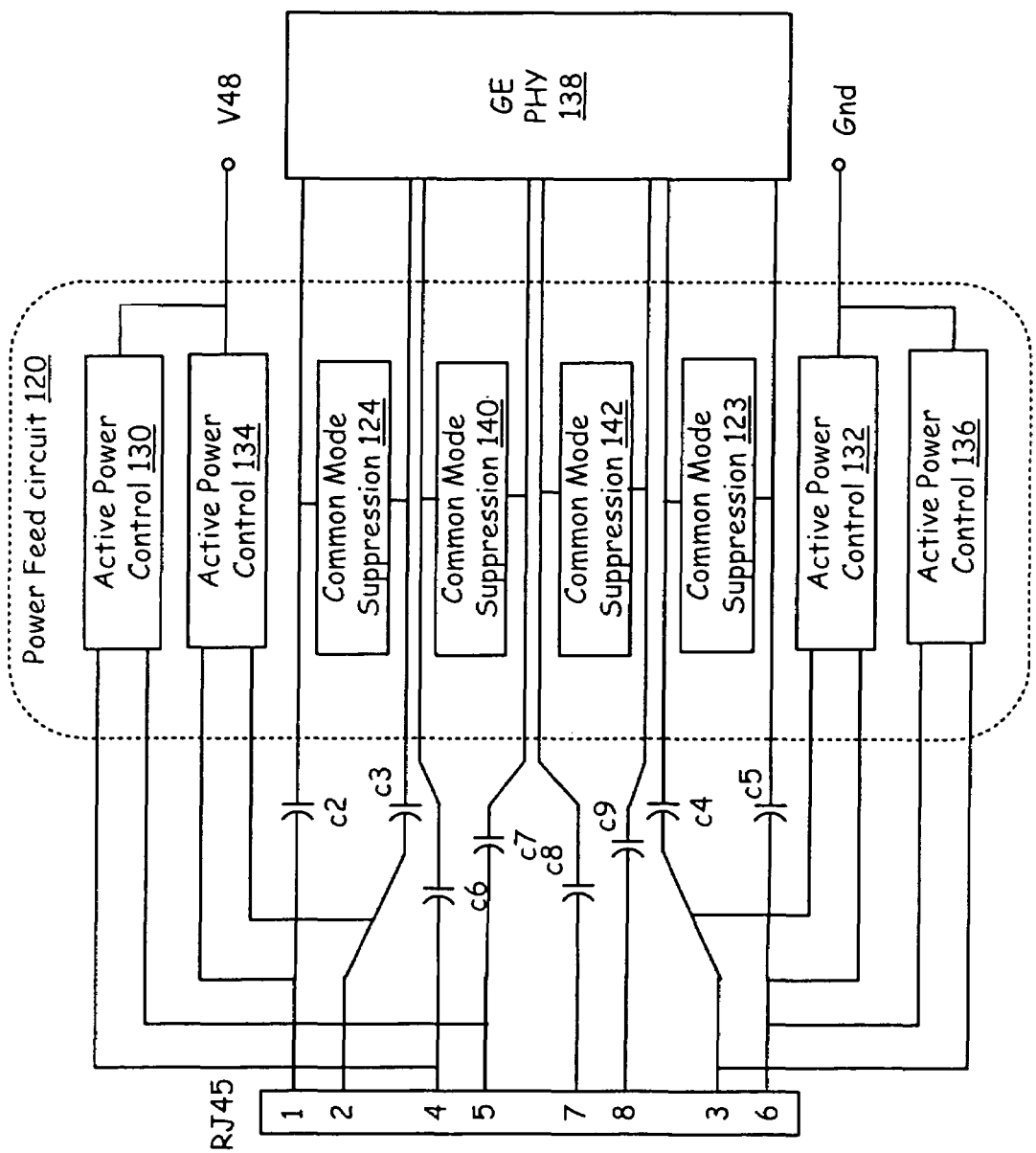

FIG. 8E increases both the ability to deliver power and data. This is achieved by supplying power and data on each Ethernet twisted pair. Active power control modules 130, 132, 134 and 136 supply power to twisted pairs (1, 2), (3, 6), (4, 5) and (7, 8) respectively. As shown in FIG. 8D, data is supplied via each twisted pair as previously discussed.

In summary, the embodiments of the present invention provide power source equipment (PSE) network device operable to provide a network signal that may include both power and data. This PSE network device includes a network connector and an integrated circuit. The network connector physically couples the PSE network device to the network. The integrated circuit further includes a power feed circuit. This power feed circuit is operable to combine and pass the received data signals and power signal as a single network signal. A PSE controller electrically couples to the integrated circuit but is not necessarily part of the integrated circuit. The PSE controller is operable to govern the production and distribution of the power portion of the network signal.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although embodiments of the present invention are described in detail, it should be understood that various changes, substitutions and alterations can be made hereto without departing from the spirit and scope of the invention.

What is claimed is:

1. A power source equipment (PSE) network device operable to distribute both a network power signal and a network data signal through a coupled network, comprising:
   a network connector operable to physically couple the PSE network device to the network;
   an integrated circuit (IC) coupled to the network connector that further comprises a power feed circuit, wherein the power feed circuit is operable to:
      exchange data signals with a network physical layer (PHY) module, Ethernet switch, and the network connector; and
      pass the power signal to the network connector as directed by a power source equipment (PSE) controller, wherein the power signal is received from an isolated power supply.

2. The PSE network device of claim 1, wherein the data signal is provided ground isolation.

3. The PSE network device of claim 2, wherein the data signal ground isolation is provided with an isolation module coupled to the network PHY module and the power feed circuit.

4. The PSE network device of claim 3, wherein the isolation module isolates the data signal capacitively or optically.

5. The PSE network device of claim 3, wherein the isolation module isolates the data signal capacitively, optically or using a transformer.

6. The PSE network device of claim 2, wherein the data signal ground isolation is provided with an isolation module coupling to the network PHY module to an external data source.

7. The PSE network device of claim 1, wherein power ground isolation is provided by the isolated power supply.

8. The PSE network device of claim 1, wherein a network switch coupled to the network PHY module is powered using a second power supply.

9. The PSE network device of claim 1, wherein the power feed circuit provides improved electromagnetic interference performance.

10. The PSE network device of claim 1, wherein the IC further comprises at least one circuit selected from the group consisting of:
   the PSE controller;
   a media processor;
   a home plug manager;
   factory controller;
   a multiport switch;
   an Ethernet switch; and
   the network PHY module.

11. The PSE network device of claim 1, wherein the power signal does not exceed 57 volts.

12. The PSE network device of claim 1, wherein the Ethernet PHY module is operable to implement physical layer functions associated with data rates selected from the group of data rates consisting of: 10 Mbps, 100 Mbps, 1 Gbps, and 10 Gbps.

13. The PSE network device of claim 1, wherein the power supply is a 48 volt power.

14. The method of claim 13, wherein the PSE network device comprises at least one device selected from the group consisting of:
   an Ethernet router;
   a controller;
   a content distribution controller;
   an Ethernet switch.

15. The method of claim 13, wherein the power signal is IEEE 802.3af compliant.

16. The method of claim 13, wherein the PSE network device is operable to determine if the Ethernet network PD is IEEE 802.3af compliant.

17. The method of claim 13, wherein the Ethernet network comprises at least one network selected from the group consisting of:
   a vehicle based network;
   a high speed data network;
   a low speed data network;
   a local-interconnect network (LIN);
   a controller area network (CAN);
   a FlexRay network;
   a TTCAN network;
   a J1939 compliant network;
   a ISO 11898 compliant network;
   a Homeplug network;
   a Home PNA network; and
   an ISO 11519-2 compliant network.

18. The PSE network device of claim 1, wherein the PSE network device further comprises a multi-port switch operable to couple the Ethernet PHY module to an external network.

19. The PSE network device of claim 1, wherein the power signals are IEEE 802.3af compliant.

20. The PSE network device of claim 19, wherein:
   the network comprises an Ethernet network and the network connectors comprises an RJ45 connector that physically couples the PSE network device to the Ethernet network, and wherein the RJ45 connector couples twisted pairs that further comprise conductors 1 and 2; 3 and 6; 4 and 5; and 7 and 8; and
   the Ethernet power signal utilizes conductors 1, 2, 3, and 6 and/or conductors 4, 5, 7, and 8.

21. The method of claim 20, wherein the IC further comprises at least one circuit selected from the group consisting of:
   the PSE controller;
   a media processor;
   a home plug manager;

factory controller;
a multiport switch;
an Ethernet switch; and
the network PHY module.

22. The PSE network device of claim 1, wherein the PSE network device is operable to determine if a network device that receives the network power signal is IEEE 802.3af power device compliant.

23. A method to supply power from a power source equipment (PSE) network device with an Ethernet power signal fed through an Ethernet network connection, comprising:
  physically coupling the PSE network device to an isolated power supply, wherein an integrated circuit (IC) within the PSE network device produce the Ethernet power signal from power supplied by the isolated power supply;
  physically coupling the PSE network device to an Ethernet network;
  combining with the IC, an Ethernet data signal and the Ethernet power signal to produce an Ethernet signal;
  providing ground isolation for the Ethernet data signal and the Ethernet power signal; and
  exchanging the Ethernet signal with at least one Ethernet network power device (PD) physically coupled to the Ethernet network within the PSE network device.

24. The method of claim 23, physically coupling the PSE network device to the Ethernet network further comprises interfacing the IC to a plurality of twisted pairs, wherein the plurality of twisted pairs pass the Ethernet signal.

25. The method of claim 23, wherein:
  an RJ45 connector physically couples the PSE network device to the Ethernet network, and wherein the RJ45 connector couples twisted pairs that further comprise conductors 1 and 2; 3 and 6; 4 and 5; and 7 and 8.

26. The method of claim 23, wherein the PSE network device further comprises an Ethernet PHY module operable to implement physical layer functions associated with data rates selected from the group of data rates consisting of: 10 Mbps, 100 Mbps, 1 Gbps, and 10 Gbps.

27. The method of claim 23, wherein the IC comprises a power feed circuit, wherein the power feed circuit is operable to:
  exchange data signals with an Ethernet physical layer (PHY) module and an Ethernet connector; and
  pass the Ethernet power signal to the Ethernet connector as directed by a PSE controller.

28. A power source equipment (PSE) network device operable to distribute both an Ethernet power signal and an Ethernet data signal through a coupled Ethernet network, comprising:
  an Ethernet network connector operable to physically couple the PSE network device to the Ethernet network;
  a PSE controller; and
  an Ethernet physical layer (PHY) module operable to interface the PSE network device to a multiport switch; and
  an integrated circuit (IC) coupled to the Ethernet network connector that further comprises a power feed circuit, wherein the power feed circuit is operable to:
    exchange Ethernet data signals with the Ethernet PHY module and the Ethernet connector; and
    couple to a power supply operable to supply a power signal to the PSE network device;
    produce and pass the Ethernet power signal to the Ethernet connector as directed by the PSE controller.

29. The PSE network device of claim 28, wherein the IC further comprises at least one circuit selected from the group consisting of:
  the PSE controller;
  the multiport switch; and
  the Ethernet physical layer (PHY).

30. The PSE network device of claim 28, wherein the PSE network device is operable to determine if an Ethernet network PD that receives the power signal is IEEE 802.3af PD compliant.

* * * * *